United States Patent
Comer et al.

(10) Patent No.: US 7,151,943 B2
(45) Date of Patent: Dec. 19, 2006

(54) SYSTEM FOR COMMUNICATING MESSAGES VIA A FORWARD OVERHEAD CONTROL CHANNEL FOR A PROGRAMMABLE LOGIC CONTROL DEVICE

(75) Inventors: Edward I. Comer, Marietta, GA (US); Edward R. Jansson, Canton, GA (US)

(73) Assignee: Cellemetry, LLC, Atlanta, GA (US)

( * ) Notice: Subject to any disclaimer, the term of this patent is extended or adjusted under 35 U.S.C. 154(b) by 417 days.

(21) Appl. No.: 10/770,326

(22) Filed: Feb. 2, 2004

(65) Prior Publication Data

US 2004/0157597 A1    Aug. 12, 2004

Related U.S. Application Data

(63) Continuation of application No. 09/666,042, filed on Sep. 20, 2000, now Pat. No. 6,718,177.

(60) Provisional application No. 60/154,724, filed on Sep. 20, 1999.

(51) Int. Cl.
*H04Q 7/20* (2006.01)

(52) U.S. Cl. ...................... 455/458; 340/7.41

(58) Field of Classification Search ............... 455/458, 455/574, 567, 515, 466, 434, 414.1; 340/7.41, 340/7.39, 825.22, 825.23
See application file for complete search history.

(56) References Cited

U.S. PATENT DOCUMENTS

| | | | |
|---|---|---|---|
| 3,581,019 A | 5/1971 | Ryan | |
| 3,886,515 A | 5/1975 | Cottin et al. | |
| 3,973,200 A | 8/1976 | Akerberg | |
| 4,172,969 A | 10/1979 | Levine et al. | |
| 4,219,698 A | 8/1980 | Birilli et al. | |
| 4,263,480 A | 4/1981 | Levine | |
| 4,284,849 A | 8/1981 | Anderson et al. | |
| 4,342,986 A | 8/1982 | Buskirk et al. | |
| 4,361,730 A | 11/1982 | Barber et al. | |
| 4,371,751 A | 2/1983 | Hilligoss, Jr. et al. | |
| 4,454,027 A | 6/1984 | Fenton | |
| 4,486,624 A | 12/1984 | Puhl et al. | |
| 4,492,820 A | 1/1985 | Kennard et al. | |

(Continued)

FOREIGN PATENT DOCUMENTS

DE    37 12 324 C1    8/1988

(Continued)

OTHER PUBLICATIONS

EIA/TIA IS-54-B Standard; p. 115 and pp. 215-222.

(Continued)

*Primary Examiner*—Eliseo Ramos-Feliciano
*Assistant Examiner*—Emeka D. Iwuchukwu
(74) *Attorney, Agent, or Firm*—KIng & Spalding LLP

(57) ABSTRACT

Communicating commands and/or data to a remote controller, such as a programmable logic controller, coupled to a cellular communications device. Each cellular communications device can monitor the cellular network control channel for a pair of target pages within a first time period. In the event that a cellular communications device receives target pages having a matching specific identifier, the device will monitor the cellular network control channel over a second time period for at least one command page or data page. The cellular communications device can respond to the reception of one or more command or data pages by forwarding instructions or information to the controller via a communications link. In addition, the cellular communications device can acknowledge receipt of the data or command pages by issuing an acknowledgment signal.

8 Claims, 10 Drawing Sheets

U.S. PATENT DOCUMENTS

| | | |
|---|---|---|
| 4,644,347 A | 2/1987 | Lucas et al. |
| 4,644,351 A | 2/1987 | Zabarsky et al. |
| 4,646,082 A | 2/1987 | Engel et al. |
| 4,677,653 A | 6/1987 | Weiner et al. |
| 4,724,425 A | 2/1988 | Gerhart et al. |
| 4,734,928 A | 3/1988 | Weiner et al. |
| 4,750,197 A | 6/1988 | Denekamp et al. |
| 4,766,548 A | 8/1988 | Cedrone et al. |
| 4,791,658 A | 12/1988 | Simon et al. |
| 4,807,225 A | 2/1989 | Fitch |
| 4,814,763 A | 3/1989 | Nelson et al. |
| 4,823,123 A | 4/1989 | Siwiak |
| 4,825,193 A | 4/1989 | Siwiak et al. |
| 4,825,457 A | 4/1989 | Lebowitz |
| 4,833,701 A | 5/1989 | Comroe et al. |
| 4,837,800 A | 6/1989 | Freeburg et al. |
| 4,839,917 A | 6/1989 | Oliver |
| 4,866,445 A | 9/1989 | Valero et al. |
| 4,868,560 A | 9/1989 | Oliwa et al. |
| 4,868,859 A | 9/1989 | Sheffer |
| 4,875,038 A | 10/1989 | Siwiak et al. |
| 4,875,230 A | 10/1989 | Blair |
| 4,882,579 A | 11/1989 | Siwiak |
| 4,887,290 A | 12/1989 | Dop et al. |
| 4,887,291 A | 12/1989 | Stillwell |
| 4,890,315 A | 12/1989 | Bendixen et al. |
| 4,891,637 A | 1/1990 | Siwiak et al. |
| 4,891,638 A | 1/1990 | Davis |
| 4,901,340 A | 2/1990 | Parker et al. |
| 4,905,234 A | 2/1990 | Childress et al. |
| 4,914,651 A | 4/1990 | Lusignan |
| 4,928,096 A | 5/1990 | Leonardo et al. |
| 4,940,963 A | 7/1990 | Gutman et al. |
| 4,972,460 A | 11/1990 | Sasuta |
| 4,979,169 A | 12/1990 | Almond et al. |
| 4,993,059 A | 2/1991 | Smith et al. |
| 5,005,014 A | 4/1991 | Jasinski |
| 5,010,584 A | 4/1991 | Seki |
| 5,020,091 A | 5/1991 | Krolopp et al. |
| 5,020,093 A | 5/1991 | Pireh |
| 5,027,383 A | 6/1991 | Sheffer |
| 5,031,204 A | 7/1991 | McKernan |
| 5,047,763 A | 9/1991 | Kuznicki et al. |
| 5,073,919 A | 12/1991 | Hagensick |
| 5,081,667 A | 1/1992 | Drori et al. |
| 5,087,919 A | 2/1992 | Odagawa et al. |
| 5,090,051 A | 2/1992 | Muppidi et al. |
| 5,117,449 A | 5/1992 | Metroka et al. |
| 5,121,503 A | 6/1992 | Davis |
| 5,124,697 A | 6/1992 | Moore |
| 5,131,019 A | 7/1992 | Sheffer et al. |
| 5,134,644 A | 7/1992 | Garton et al. |
| 5,142,279 A | 8/1992 | Jasinski et al. |
| 5,148,473 A | 9/1992 | Freeland et al. |
| 5,153,582 A | 10/1992 | Davis |
| 5,153,902 A | 10/1992 | Buhl et al. |
| 5,153,903 A | 10/1992 | Eastmond et al. |
| 5,159,625 A | 10/1992 | Zicker |
| 5,162,790 A | 11/1992 | Jasinski |
| 5,173,933 A | 12/1992 | Jabs et al. |
| 5,175,758 A | 12/1992 | Levanto et al. |
| 5,185,779 A | 2/1993 | Dop et al. |
| 5,196,842 A | 3/1993 | Gomez et al. |
| 5,206,855 A | 4/1993 | Schwendeman et al. |
| 5,208,756 A | 5/1993 | Song |
| 5,210,787 A | 5/1993 | Hayes et al. |
| 5,218,367 A | 6/1993 | Sheffer et al. |
| 5,220,599 A | 6/1993 | Sasano et al. |
| 5,222,123 A | 6/1993 | Brown et al. |
| 5,230,081 A | 7/1993 | Yamada et al. |
| 5,239,294 A | 8/1993 | Flanders et al. |
| 5,239,678 A | 8/1993 | Grube et al. |
| 5,247,567 A | 9/1993 | Hirano |
| 5,254,986 A | 10/1993 | DeLuca |
| 5,255,307 A | 10/1993 | Mizikovsky |
| 5,265,150 A | 11/1993 | Helmkamp et al. |
| 5,278,539 A | 1/1994 | Lauterbach et al. |
| 5,278,890 A | 1/1994 | Beeson, Jr. et al. |
| 5,305,217 A | 4/1994 | Nakamura et al. |
| 5,307,399 A | 4/1994 | Dai et al. |
| 5,307,509 A | 4/1994 | Michalon et al. |
| 5,335,278 A | 8/1994 | Matchett et al. |
| 5,341,410 A | 8/1994 | Aron et al. |
| 5,363,427 A | 11/1994 | Ekstrom et al. |
| 5,365,573 A | 11/1994 | Sakamoto et al. |
| 5,369,681 A | 11/1994 | Boudreau et al. |
| 5,371,781 A | 12/1994 | Ardon |
| 5,371,898 A | 12/1994 | Grube et al. |
| 5,382,970 A | 1/1995 | Kiefl |
| 5,386,209 A | 1/1995 | Thomas |
| 5,396,537 A | 3/1995 | Schwendeman |
| 5,396,539 A | 3/1995 | Slekys et al. |
| 5,398,277 A | 3/1995 | Martin, Jr. et al. |
| 5,404,392 A | 4/1995 | Miller et al. |
| 5,432,841 A | 7/1995 | Rimer |
| 5,450,329 A | 9/1995 | Tanner |
| 5,454,027 A | 9/1995 | Kennedy et al. |
| 5,493,722 A | 2/1996 | Gunn et al. |
| 5,502,761 A | 3/1996 | Duncan et al. |
| 5,511,072 A | 4/1996 | Delprat |
| 5,511,110 A | 4/1996 | Drucker |
| 5,517,547 A | 5/1996 | Ladha et al. |
| 5,519,756 A | 5/1996 | Clift |
| 5,526,401 A | 6/1996 | Roach, Jr. et al. |
| 5,528,664 A | 6/1996 | Slekys et al. |
| 5,530,736 A | 6/1996 | Comer et al. |
| 5,533,094 A | 7/1996 | Sanmugam |
| 5,539,810 A | 7/1996 | Kennedy, III. et al. |
| 5,544,223 A | 8/1996 | Robbins et al. |
| 5,544,225 A | 8/1996 | Kennedy, III. et al. |
| 5,546,444 A | 8/1996 | Roach, Jr. et al. |
| 5,574,975 A | 11/1996 | Hill |
| 5,579,372 A | 11/1996 | Åström |
| 5,586,177 A | 12/1996 | Farris et al. |
| 5,594,740 A | 1/1997 | LaDue |
| 5,594,945 A | 1/1997 | Lewis et al. |
| 5,596,573 A | 1/1997 | Bertland |
| 5,603,091 A | 2/1997 | Linquist et al. |
| 5,610,973 A | 3/1997 | Comer |
| 5,619,209 A | 4/1997 | Horstein et al. |
| 5,625,889 A | 4/1997 | Chikkaswamy et al. |
| 5,629,975 A | 5/1997 | Tiedemann, Jr. et al. |
| 5,640,139 A * | 6/1997 | Egeberg ............... 340/426.19 |
| 5,648,966 A | 7/1997 | Kondo et al. |
| 5,652,570 A | 7/1997 | Lepkofker |
| 5,675,371 A | 10/1997 | Barringer |
| 5,678,179 A | 10/1997 | Turcotte et al. |
| 5,680,551 A | 10/1997 | Martino, II. |
| 5,684,858 A | 11/1997 | Hartmann et al. |
| 5,686,888 A | 11/1997 | Welles, II. et al. |
| 5,701,302 A | 12/1997 | Geiger |
| 5,722,067 A | 2/1998 | Fougnies et al. |
| 5,742,668 A | 4/1998 | Pepe et al. |
| 5,742,905 A | 4/1998 | Pepe et al. |
| 5,745,867 A | 4/1998 | Mills |
| 5,748,104 A * | 5/1998 | Argyroudis et al. ... 340/870.11 |
| 5,751,789 A | 5/1998 | Farris et al. |
| 5,754,954 A | 5/1998 | Cannon et al. |
| 5,758,313 A | 5/1998 | Shah et al. |
| 5,761,621 A | 6/1998 | Sainton |
| 5,767,788 A | 6/1998 | Ness |
| 5,768,343 A | 6/1998 | Dame et al. |
| 5,777,605 A | 7/1998 | Yoshinobu et al. |
| 5,781,612 A | 7/1998 | Choi et al. |

| Patent No. | Date | Inventor(s) | Class |
|---|---|---|---|
| 5,787,149 A | 7/1998 | Yousefi et al. | |
| 5,787,357 A | 7/1998 | Salin | |
| 5,790,631 A | 8/1998 | Minarczik et al. | |
| 5,794,144 A | 8/1998 | Comer et al. | |
| 5,797,097 A | 8/1998 | Roach, Jr. et al. | |
| 5,805,997 A | 9/1998 | Farris | |
| 5,819,184 A | 10/1998 | Cashman | |
| 5,822,221 A | 10/1998 | Groenteman | |
| 5,822,423 A | 10/1998 | Jehnert et al. | |
| 5,826,195 A | 10/1998 | Westerlage et al. | |
| 5,845,203 A | 12/1998 | LaDue | |
| 5,845,211 A | 12/1998 | Roach, Jr. | |
| 5,862,201 A | 1/1999 | Sands | |
| 5,862,480 A | 1/1999 | Wild et al. | |
| 5,862,481 A | 1/1999 | Kulkarni et al. | |
| 5,873,043 A | 2/1999 | Comer | |
| 5,875,863 A | 3/1999 | Jarvis et al. | |
| 5,878,351 A | 3/1999 | Alanara et al. | |
| 5,884,216 A | 3/1999 | Shah et al. | |
| 5,889,474 A | 3/1999 | LaDue | |
| 5,898,917 A | 4/1999 | Batni et al. | |
| 5,901,142 A | 5/1999 | Averbuch et al. | |
| 5,909,651 A * | 6/1999 | Chander et al. | 455/466 |
| 5,913,166 A | 6/1999 | Buttitta et al. | |
| 5,917,449 A | 6/1999 | Sanderford et al. | |
| 5,917,886 A | 6/1999 | Halkio | |
| 5,918,172 A | 6/1999 | Saunders et al. | |
| 5,920,822 A | 7/1999 | Houde et al. | |
| 5,924,026 A | 7/1999 | Krishnan | |
| 5,933,784 A | 8/1999 | Gallagher et al. | 455/552 |
| 5,946,629 A | 8/1999 | Sawyer et al. | |
| 5,946,630 A | 8/1999 | Willars et al. | |
| 5,999,808 A | 12/1999 | LaDue | |
| 6,012,013 A | 1/2000 | McBurney | |
| 6,012,014 A | 1/2000 | Koyanagi et al. | |
| 6,014,089 A | 1/2000 | Tracy et al. | |
| 6,018,657 A | 1/2000 | Kennedy, III. et al. | |
| 6,025,774 A | 2/2000 | Forbes | 340/426 |
| 6,026,345 A | 2/2000 | Shah et al. | |
| 6,049,273 A | 4/2000 | Hess | |
| 6,067,454 A | 5/2000 | Foti | 455/433 |
| 6,070,070 A | 5/2000 | Ladue | |
| 6,072,862 A | 6/2000 | Srinivasan | |
| 6,078,811 A | 6/2000 | Lin et al. | 455/433 |
| 6,078,820 A | 6/2000 | Wells et al. | |
| 6,081,514 A | 6/2000 | Raith | |
| 6,081,546 A | 6/2000 | Williamson et al. | |
| 6,088,431 A | 7/2000 | LaDue | |
| 6,094,578 A | 7/2000 | Purcell et al. | 455/426 |
| 6,097,951 A | 8/2000 | Ernam et al. | |
| 6,108,537 A | 8/2000 | Comer et al. | |
| 6,108,540 A | 8/2000 | Sonti et al. | |
| 6,111,539 A | 8/2000 | Mannings et al. | |
| 6,122,514 A | 9/2000 | Spaur et al. | |
| 6,125,275 A | 9/2000 | Comer et al. | |
| 6,138,034 A * | 10/2000 | Willey | 455/522 |
| 6,144,722 A | 11/2000 | Anderson et al. | |
| 6,144,859 A * | 11/2000 | LaDue | 455/511 |
| 6,148,202 A | 11/2000 | Wortham | |
| 6,150,955 A | 11/2000 | Tracy et al. | |
| 6,151,507 A | 11/2000 | Laiho et al. | 455/466 |
| 6,154,648 A | 11/2000 | Comer | |
| 6,154,658 A | 11/2000 | Caci | |
| 6,161,020 A | 12/2000 | Kim | |
| 6,163,701 A | 12/2000 | Saleh et al. | |
| 6,169,895 B1 | 1/2001 | Buhrmann et al. | |
| 6,175,732 B1 | 1/2001 | McDaniel et al. | |
| 6,185,198 B1 | 2/2001 | LaDue | |
| 6,195,546 B1 | 2/2001 | Leung et al. | |
| 6,215,404 B1 | 4/2001 | Morales | |
| 6,233,450 B1 | 5/2001 | Seppanen | |
| 6,236,357 B1 | 5/2001 | Corwith | |
| 6,249,217 B1 | 6/2001 | Forbes | 340/426 |
| 6,259,781 B1 | 7/2001 | Crouch et al. | 379/207 |
| 6,263,212 B1 | 7/2001 | Ross et al. | |
| 6,282,496 B1 | 8/2001 | Chowdhary | |
| 6,285,868 B1 | 9/2001 | LaDue | |
| 6,285,953 B1 | 9/2001 | Harrison et al. | |
| 6,292,669 B1 | 9/2001 | Meuronen et al. | |
| 6,297,768 B1 | 10/2001 | Allen, Jr. | |
| 6,298,232 B1 | 10/2001 | Marin et al. | 455/413 |
| 6,311,056 B1 | 10/2001 | Sandidge | |
| 6,311,060 B1 | 10/2001 | Evans et al. | |
| 6,330,452 B1 | 12/2001 | Fattouche et al. | |
| 6,353,743 B1 | 3/2002 | Karmel | |
| 6,353,745 B1 | 3/2002 | Wehrend et al. | 455/466 |
| 6,363,249 B1 | 3/2002 | Nordeman et al. | 455/418 |
| 6,363,254 B1 | 3/2002 | Jones et al. | |
| 6,363,324 B1 | 3/2002 | Hildebrant | |
| 6,369,719 B1 | 4/2002 | Tracy et al. | 340/870.02 |
| 6,370,135 B1 | 4/2002 | Gardner | |
| 6,377,210 B1 | 4/2002 | Moore | |
| 6,389,289 B1 | 5/2002 | Voce et al. | |
| 6,393,295 B1 * | 5/2002 | Butler et al. | 455/458 |
| 6,397,056 B1 | 5/2002 | Bugnon et al. | |
| 6,405,033 B1 | 6/2002 | Kennedy, III. et al. | |
| 6,424,828 B1 | 7/2002 | Collins et al. | |
| 6,424,841 B1 | 7/2002 | Gustafsson | |
| 6,457,038 B1 | 9/2002 | Defosse | 709/200 |
| 6,476,763 B1 | 11/2002 | Allen, Jr. | 342/357.1 |
| 6,484,035 B1 | 11/2002 | Allen, Jr. | 455/456 |
| 6,493,556 B1 | 12/2002 | Stinson | 455/445 |
| 6,493,558 B1 | 12/2002 | Bernhart et al. | 455/466 |
| 6,515,997 B1 | 2/2003 | Feltner et al. | 370/401 |
| 6,560,456 B1 | 5/2003 | Lohtia et al. | 455/445 |
| 6,570,532 B1 | 5/2003 | Mise et al. | |
| 6,618,671 B1 | 9/2003 | Dooley et al. | |
| 6,622,016 B1 | 9/2003 | Sladek et al. | 455/414 |
| 6,625,461 B1 | 9/2003 | Bertacchi | 455/466 |
| 6,710,738 B1 | 3/2004 | Allen, Jr. | 342/357.1 |
| 6,714,793 B1 | 3/2004 | Carey et al. | 455/466 |
| 6,718,177 B1 | 4/2004 | Comer et al. | |
| 6,718,237 B1 | 4/2004 | Murray et al. | |
| 6,738,647 B1 | 5/2004 | Link, II. | |
| 6,741,853 B1 | 5/2004 | Jiang et al. | 455/418 |
| 6,745,041 B1 | 6/2004 | Allison et al. | 455/466 |
| 6,760,580 B1 | 7/2004 | Robinson et al. | 455/412.2 |
| 6,771,949 B1 | 8/2004 | Corliss | 455/413 |
| 6,782,276 B1 | 8/2004 | Lam et al. | 455/560 |
| 6,856,808 B1 | 2/2005 | Comer et al. | 455/466 |
| 6,865,191 B1 | 3/2005 | Bengtsson et al. | 370/475 |
| 6,882,843 B1 | 4/2005 | Comer | 455/445 |
| 2001/0003093 A1 | 6/2001 | Lundin | |
| 2001/0042121 A1 | 11/2001 | Defosse et al. | 709/224 |
| 2001/0047244 A1 | 11/2001 | Harrison et al. | |
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0086636 A1 | 7/2002 | Tracy et al. | 455/3.01 |
| 2002/0110230 A1 | 8/2002 | Leuca et al. | 379/201.01 |
| 2002/0155844 A1 | 10/2002 | Rankin et al. | |
| 2002/0160771 A1 | 10/2002 | Massie et al. | 455/426 |
| 2002/0164988 A1 | 11/2002 | Vishwanathan et al. | 455/445 |
| 2002/0194387 A1 | 12/2002 | Defosse | 709/251 |
| 2002/0196924 A1 | 12/2002 | Dahari | 379/220.01 |
| 2003/0003930 A1 | 1/2003 | Allison et al. | 455/466 |
| 2003/0009313 A1 | 1/2003 | May et al. | 702/188 |
| 2003/0021273 A1 | 1/2003 | Fouquet et al. | |
| 2003/0022656 A1 | 1/2003 | Hinnant, Jr. et al. | |
| 2003/0054830 A1 | 3/2003 | Williams et al. | |
| 2003/0097474 A1 | 5/2003 | Defosse | 709/246 |
| 2003/0101257 A1 | 5/2003 | Godwin | |
| 2003/0101262 A1 | 5/2003 | Godwin | 709/224 |
| 2003/0119498 A1 | 6/2003 | Haas et al. | 455/426 |
| 2003/0129969 A1 | 7/2003 | Rucinski | 455/412 |
| 2003/0204391 A1 | 10/2003 | May et al. | 704/8 |

| | | | |
|---|---|---|---|
| 2004/0029598 A1 | 2/2004 | Guggisberg | 455/466 |
| 2004/0110493 A1 | 6/2004 | Alvarez et al. | 455/414.1 |
| 2004/0142707 A1 | 7/2004 | Midkiff et al. | 455/466 |
| 2004/0180678 A1 | 9/2004 | Smith et al. | 455/466 |
| 2004/0203640 A1 | 10/2004 | Molander et al. | 455/414.1 |
| 2005/0037784 A1 | 2/2005 | Cleary | 455/466 |

FOREIGN PATENT DOCUMENTS

| | | |
|---|---|---|
| EP | 0 123 456 A2 | 10/1984 |
| EP | 0 123 562 B1 | 7/1990 |
| EP | 0 624 020 A1 | 11/1994 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |
| WO | WO 95/25407 A1 | 9/1995 |
| WO | WO 95/26088 A1 | 9/1995 |
| WO | WO 96/03007 A1 | 2/1996 |
| WO | WO 96/10895 A1 | 4/1996 |
| WO | WO 96/37079 A1 | 11/1996 |
| WO | WO 96/38989 A1 | 12/1996 |
| WO | WO 97/36435 A1 | 10/1997 |
| WO | WO 97/38540 A1 | 10/1997 |
| WO | WO 97/45991 A2 | 12/1997 |
| WO | WO 98/06227 A2 | 2/1998 |
| WO | WO/98/19438 A1 | 5/1998 |
| WO | WO 98/19447 A1 | 5/1998 |
| WO | WO 98/27780 A2 | 6/1998 |
| WO | WO 99/26428 A1 | 5/1999 |
| WO | WO 99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 03/19925 A2 | 3/2003 |
| WO | WO 2005/074430 A2 | 8/2005 |

OTHER PUBLICATIONS

European Telecommunication Standards Institute; *European Digital Cellular Telecommunications System (Phase 2); Technical Realization of the Short Message Service (SMS) Point to Point (PP) (GSM 03.40)*; European Telecommunication Standard; Oct. 1993; Draft pr ETS 300 536; pp. 1-103.

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

Isochron Data Corporation; *Connect With Your Vending Machines—and Watch Your Profits Soar;* www.isochron.com/solutions_VC.htm; (2002); pp. 1-2.

Lee, William C. Y.; *Mobile Cellular Telecommunications Systems;* ISBN 0-07-037030-3; 1989; pp. 74-80.

Mouly et al.; *The GSM System for Mobile Communications;* ISBN: 2-9507190-0-7; © 1992; pp. 56-59.

TIA/EIA IS-41.5-C Standard; pp. 24, 65, 206, 207.

* cited by examiner

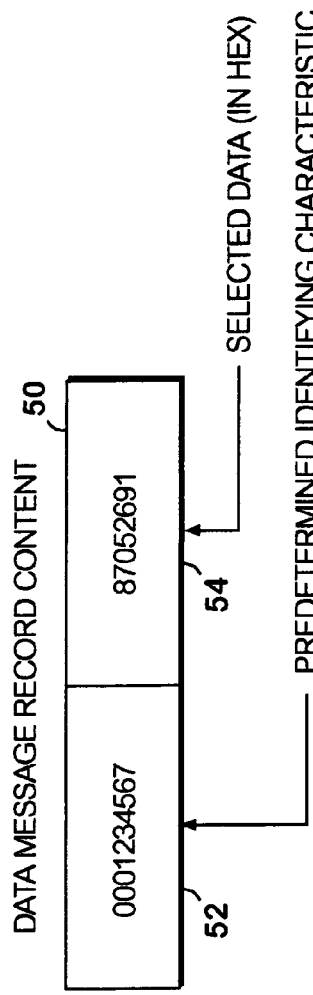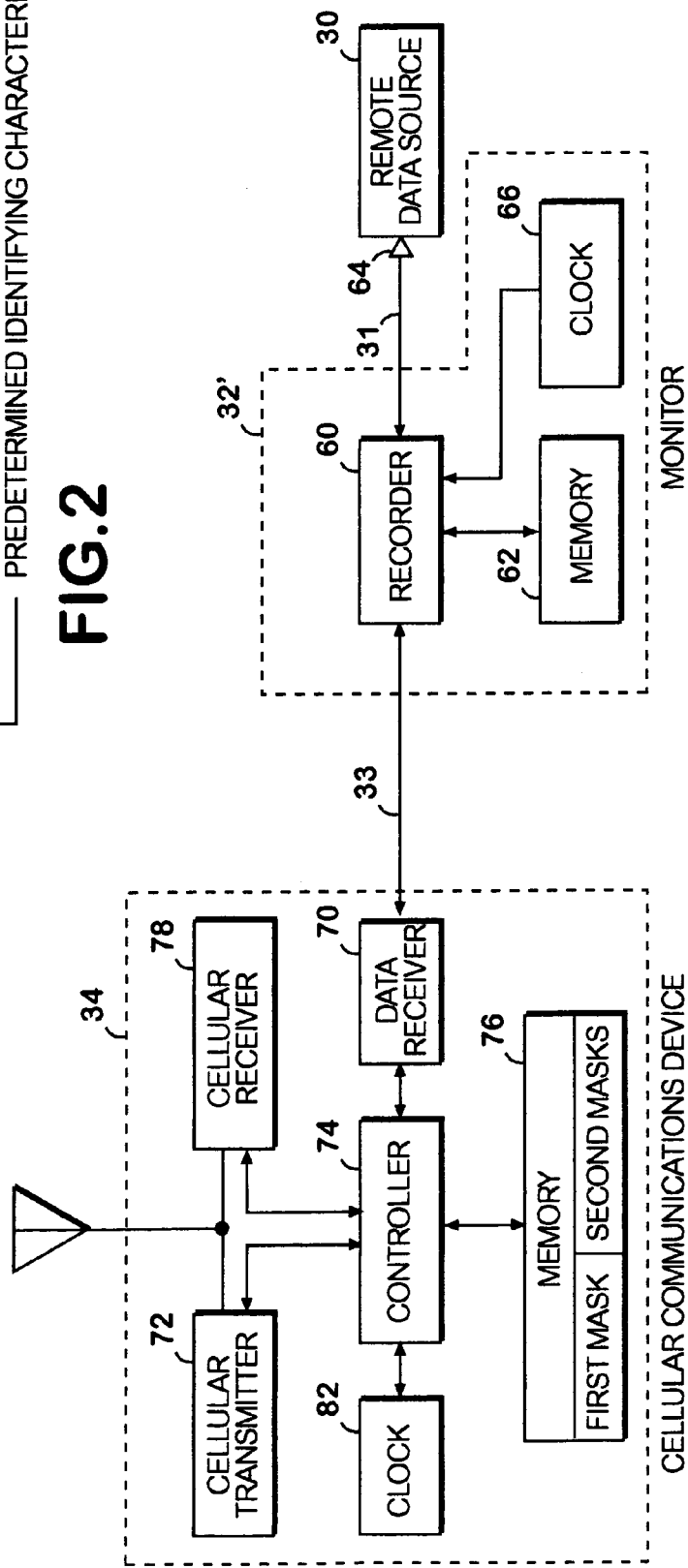

SYSTEM FOR COMMUNICATING MESSAGES VIA A FORWARD OVERHEAD CONTROL CHANNEL FOR A PROGRAMMABLE LOGIC CONTROL DEVICE

RELATED APPLICATIONS

The present application claims priority under 35 U.S.C. § 119 to U.S. Provisional Patent Application Ser. No. 60/154, 724, filed on Sep. 20, 1999, fully incorporated herein by reference, and is related to U.S. patent application Ser. No. 08/212,039, filed on Mar. 11, 1994, now issued as U.S. Pat. No. 5,546,444, to U.S. patent application Ser. No. 08/331, 794, filed on Oct. 31, 1994, now issued as U.S. Pat. No. 5,526,401, and to U.S. patent application Ser. No. 08/769, 142, filed on Dec. 18, 1996, now issued as U.S. Pat. No. 5,873,043.

RELATED APPLICATION

The present application is a continuation of and claims priority to U.S. application entitled System for Communicating Messages Via a Forward Overhead Control Channel For a Programmable Logic Control Device, filed Sep. 20, 2000, having Ser. No. 09/666,042 now U.S. Pat. No. 6,718, 177.

TECHNICAL FIELD

The present invention relates generally to data communications systems and more particularly relates to protocols for communicating with a programmable logic control device by sending a data sequence, typically one or more pages, via a forward overhead control channel of a cellular network control channel for a cellular mobile radiotelephone system.

BACKGROUND OF THE INVENTION

In recent years, the communications industry has shown a growing interest in various types of wireless communications systems for communicating voice and/or data between numerous remote sites and a central location. It is well recognized that the use of a dedicated telephone facility for a conventional telephone system is not a convenient or economical option for all communications applications. For example, for many industrial applications, a central data collection site has a need for acquiring information from a variety of remotely located monitoring devices that collect data about the operation or performance of equipment. To overcome the limitations of the conventional telephone system, a two-way wireless communications link is often necessary to permit a response to a communication initiated from another location. In an attempt to solve the problem of supplying a response to an initial communication, the industry has offered various wireless communications systems, including two-way radios, cellular mobile radiotelephones, and paging systems.

To overcome the limitations of prior communications systems, the assignee for the present invention has developed a system for communicating data via a cellular network control channel of a cellular mobile radiotelephone (CMR) system. U.S. Pat. Nos. 5,526,401, 5,546,444, and 5,873,043, which are assigned to the assignee for the present application and contain subject matter fully incorporated herein by reference, describe an adapted use of the existing architecture of a CMR system in an efficient and cost-effective manner to support communications via the CMR system, including collection and reporting of data obtained at remote sites.

The data message system described in the referenced U.S. patents includes data reporting devices, at least one mobile switching center (MSC), and a data collection system connected directly or indirectly to the MSC or a Signal Transfer Point (STP). The MSC can issue commands or instructions, typically in a sequence of page messages, to the data reporting devices via the cellular network control channel of the CMR system. Each data reporting device can monitor the operation of a remote data source to collect selected data or can control the operation of a remote item in response to commands transmitted over the via the MSC. The data reporting device can transmit a data message containing the selected data via a cellular network control channel of the CMR system when the data reporting device first identifies itself or "registers" for operation with the MSC. Alternatively, the data reporting device can send the selected data via the cellular network control channel in a data message formatted to represent a "call origination" signal. In turn, the MSC can send the data message to the data collection system via a communications link. In this manner, the data message system takes advantage of an installed base of cellular communications equipment by using the cellular network control channel for data communications between a central location and one or more remote sites.

The data reporting device of the data message system typically communicates with the MSC via the reverse overhead control channel (RECC) of the cellular network control channel. In contrast, the MSC can communicate with a cellular-compatible device, such as a data reporting device, via the forward overhead control channel (FOCC) of the cellular network control channel. The conventional technique for sending a message to a cellular mobile radiotelephone from an MSC is the transmission of a page message over the FOCC. For example, a conventional cellular mobile radiotelephone can be stimulated by a transmission of the MSC to locate the mobile telephone unit when an incoming call from a landline has been placed to this unit. The data requirement for this type of trigger message is minimal for conventional cellular communications and, consequently, each message is independently processed as a complete data packet. This works well for the paging operations conducted by an MSC with conventional cellular mobile radiotelephones via the FOCC. However, this mechanism significantly limits the amount of information or instruction that can be provided by the MSC to a data reporting device via a page carried by the cellular network control channel. This is a disadvantage for applications requiring the communication of a commands and/or data via the CMR system to a remote cellular communications device for use by a controller, such as a programmable logic controller (PLC), coupled to a controllable item or instrument.

In view of the foregoing, there is a need for adapting the paging mechanism of a CMR system to support the transfer of commands and/or data for communications from an MSC to a cellular-compatible device. There is a further need for communicating with and controlling the operations of a remote controller, such as a PLC, coupled to a cellular-compatible device that can accept commands and/or data via the paging mechanism of a CMR system.

SUMMARY OF THE INVENTION

The present inventions solves the needs of the prior art by providing a method for communicating with cellular communication devices by sending multiple pages via a cellular network control channel of a cellular mobile radiotelephone (CMR) system. Each cellular communications device operating within the coverage area of the CMR system can monitor the Forward Overhead Control Channel (FOCC) of the cellular network control channel for a pair of pages, commonly described as target pages, within a first time period. Each target page includes a specific identifier assigned to one or more of the cellular communications devices. Each cellular communications device maintains a mask in memory for storing one or more specific identifiers assigned to that device. In the event that a cellular communications device receives a page, such as the target page, having a matching specific identifier, the device will complete an action responsive to that page. Otherwise, a cellular communications device will ignore a page having a specific identifier that does not match an identifier assigned to that device.

In response to receiving a pair of pages having a matching specific identifier within the first time period, typically 60 seconds, the cellular communications device monitors the cellular network control channel over a second time period for at least one data page having a predetermined characteristic designating the page as carrying data. For a data page formatted as a cellular telephony signal having a Mobile Identification Number (MIN) field, the predetermined characteristic can be defined as a 2, 3, 4, 5 or 6 positioned in the least significant digit (LSD) of the MIN carried by that page.

In response to receiving at least one data page having a predetermined characteristic during the second time period, the cellular communications device can collect the data carried by the received data page. This data can be stored at the cellular communications device for subsequent use or is forwarded for processing by another device, such as a programmable logic controller (PLC). To acknowledge receipt of the data, the cellular communications device can send an acknowledgement signal via the cellular network control channel. This acknowledgement signal can be formatted as a cellular telephony Autonomous Registration signal and carries an indication of data verification. A mobile switching center (MSC) typically receives the acknowledgement signal via the Reverse Overhead Control Channel (RECC) of the cellular network control channel.

For one aspect of the invention, the cellular communications device can continue to monitor the FOCC for a second consecutive data page if the predetermined characteristic in the first received data page specifies that a pair of consecutive pages carry data. This monitoring operation is typically carried out over the second time period. If the second data page is received during the second time period, then the cellular communications device can collect the data carried by both the first and second pages. The combination of data collected from the first and second pages can be forwarded by the cellular communications device to the PLC via a wired or wireless communications link. The cellular communications device can verify receipt of the data carried by both pages and issue an acknowledgement signal via the RECC to acknowledge receipt of such data. This acknowledgement signal can be formatted as an Autonomous Registration signal comprising an Acknowledge Pattern (AAA hex) within the upper 12 bits and collected data, represented in BCD, big-endian order format, within the lower 12 bits.

For another aspect of the invention, a cellular communications device can terminate monitoring operations prior to expiration of the second time period if the predetermined characteristic in the first received data page specifies that only a single page carries data. The cellular communications device can collect the data carried by the first data page and issue an acknowledgement signal via the RECC to acknowledge receipt of the data carried by that page. This acknowledgement signal can be formatted as an Autonomous Registration signal comprising an Acknowledge Pattern (AAAAAA hex) within the upper 24 bits and collected data represented in BCD, big endian order format, within the lower 8 bits.

The present invention also provides a method for communicating a programming command to a controller, such as a PLC, by sending multiple pages via the cellular network control channel of a CMR system. The PLC is typically coupled to a cellular communications device via a wired or wireless communications link. The cellular communications device can monitor the FOCC of the cellular network control channel for a target page having a specific identifier assigned to that communications device. Timely receipt of one or more target pages having a specific identifier assigned to the cellular communications device within a predetermined time period prompts that device to monitor the FOCC for a schedule page.

In response to receiving the target page(s), the cellular communications device can monitor for a time period the FOCC for a schedule page having a schedule command. The schedule command identifies a slot number in a look-up table maintained in memory by the PLC. This slot number represents a specific storage location within the look-up table for maintaining a programming command for the PLC.

In response to receiving the schedule page during the time period, the cellular communications device can forward the slot number to the PLC via the communications link. In turn, the PLC can retrieve from its look-up table the programming command identified by the slot number and initiate a program action associated with that programming command. The cellular communications device also can send an acknowledgement signal via the cellular network control channel to acknowledge receipt of the schedule command.

The present invention further provides a method for communicating a reprogramming command to a PLC by sending multiple pages via a cellular network control channel of the CMR system. A cellular communications device, which is coupled to the PLC, monitors the FOCC for one or more target pages having a specific identifier assigned to that device. In response to receiving target page(s) with a matching specific identifier during a time period, the cellular communication devices monitors the FOCC for a schedule page having a schedule command. The schedule command identifies a slot number specifying a particular stock in the PLC's look-up table containing programming data. In response to receiving the schedule page during a time period, the cellular communications device monitors the FOCC for a data page carrying new programming data. Responsive to receiving the data page, the cellular communications devices forwards to the PLC the slot number and the new programming data. In addition, the cellular communications device sends an acknowledgement signal via the cellular network control channel to acknowledge receipt of the slot number and programming data.

In view of the foregoing, it will be understood that a cellular communications device operating within the coverage area of a CMR System can receive multiple pages via the FOCC and provide data extracted from one or more of these pages to a controller, such as PLC. The PLC, which is typically coupled to a controllable instrument, can accept the extracted data as programming data representing new or replacement program commands. In contrast to the prior art, the communication of programming data to a PLC requires the reception of multiple pages by a cellular communications device via the FOCC. These and other objectives of the present invention will become evident upon a review of the detailed description, the drawing set and the appended claim set.

BRIEF DESCRIPTION OF THE DRAWINGS

FIG. 2 is a diagram that shows the format for a data message that is exchanged between a cellular communications device and a mobile switching center (MSC) of the data message system illustrated in FIG. 1.

FIG. 3 is a block diagram of an exemplary data reporting system for the data message system illustrated in FIG. 1.

DETAILED DESCRIPTION OF THE EXEMPLARY EMBODIMENTS

Figure 1:
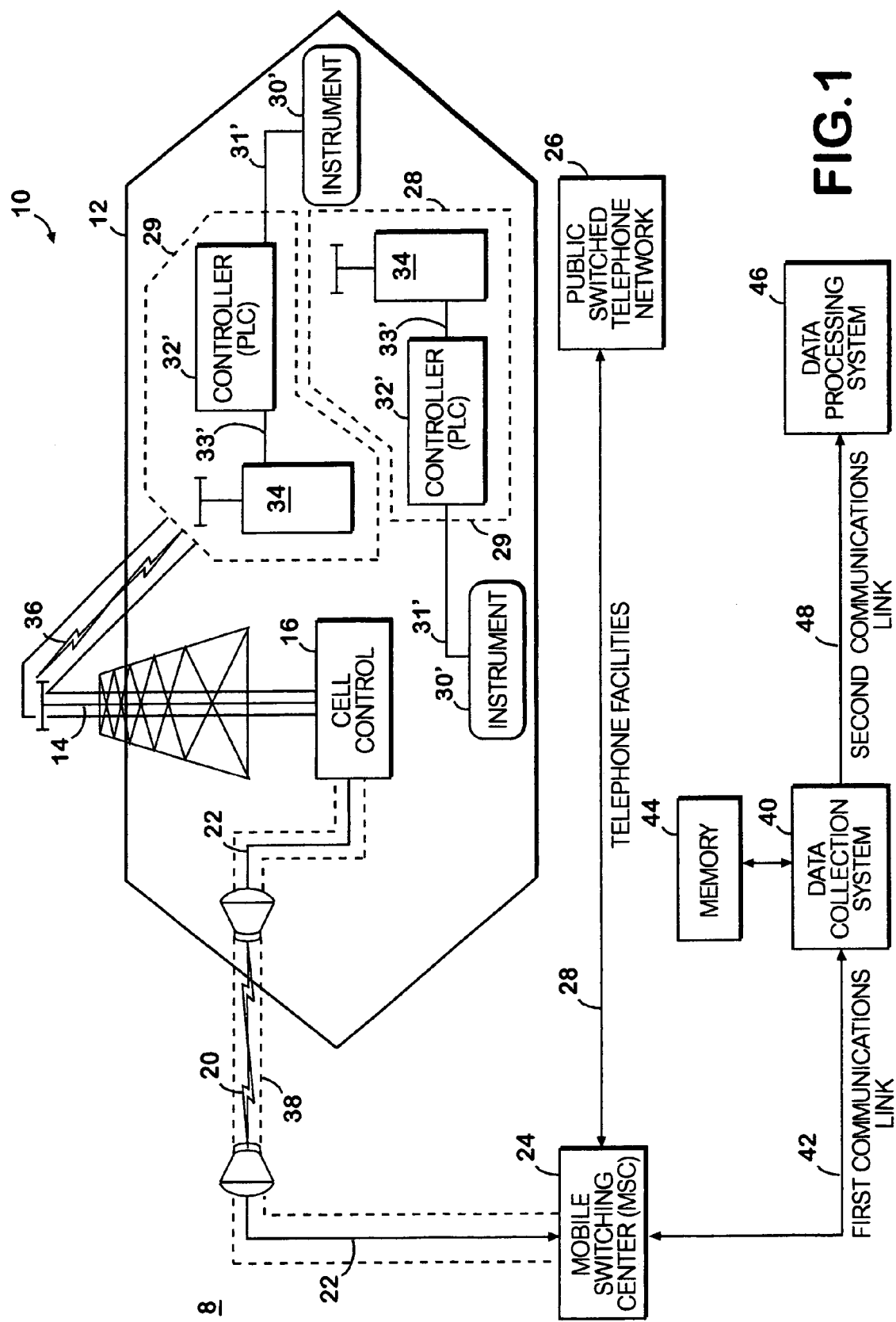
FIG. 1 is a block diagram of a data message system constructed in accordance with an exemplary embodiment of the present invention.

The present invention is directed to a system for communicating with a cellular communications device by sending one or more paging messages, commonly described as pages, via a cellular network control channel of a cellular mobile radiotelephone (CMR) system and using data of the received pages to control the operations of a remote controller. Although a conventional cellular device can receive and process discrete pages transmitted over a forward overhead control channel (FOCC) of the cellular network control channel, the present invention provides the advantage of communicating commands (and data) to a cellular-compatible device for use in connection with a controller, such as a programmable logic controller (PLC) device, that controls a field instrument. This adds a new communication function for a device capable of monitoring the cellular network control channel because selected pages can be received and processed to achieve remote control over the operations completed by the controller on behalf of a controlled instrument. It will be appreciated that the cellular-compatible device can be integrated within the assembly of the PLC device or housed in an assembly separate from the PLC device.

The data communication capacity offered by the present invention supports the transmission and processing of data and commands or instructions, whereas a prior paging mechanism was limited to sending a command instructing a selected cellular device to register with the CMR system in response to a telephone call. In contrast to the discrete page processing conducted by prior cellular devices, the present invention uses one or more pages carried by the cellular network control channel to form a command and/or data sequence for use by a controller coupled to the receiving device. The invention is particularly useful for communicating and programming schedule information for the control operations of a PLC coupled to the cellular-compatible device.

The present invention is preferably implemented for use with a data message system that adapts an existing architecture and communications protocols for a conventional CMR system to supply an advantageous approach to the communication of data collected from one or more remote sites. In this data message system, which is described in U.S. Pat. Nos. 5,546,444, 5,526,401 and 5,873,043, a cellular communications device can send a data message to a mobile switching center (MSC) via the cellular network control channel. In addition, the MSC can send commands and/or data in the form of pages to one or more cellular communications devices via the cellular network control channel. U.S. Pat. Nos. 5,546,444, 5,526,401 and 5,873,043 are assigned to the assignee of the present application and are hereby fully incorporated herein by reference.

It will be understood that the communication of messages between the MSC and a cellular communications device can be conducted by adapting conventional techniques and known protocols of a CMR system for data communications. Accordingly, prior to describing the detailed operation of the data message system, it will be useful to review the operation of a typical CMR system.

A CMR system is generally characterized by dividing a radio coverage area into smaller coverage areas or "cells" using low power transmitters and coverage-restricted receivers. As will be known to those skilled in the art, the limited coverage area allows the radio channels used in one cell to be reused in another cell. As a mobile radiotelephone within one cell moves across the boundary of the cell and into an adjacent cell, control circuitry associated with the cells detects that the signal strength of the mobile radiotelephone in the just-entered cell is stronger, and communications with the mobile radiotelephone are handed-off to the just-entered cell.

A CMR system typically uses a pair of radio frequencies for each radio channel and each cell. Each cell typically includes at least one signaling channel, also referred to as a cellular network control channel or an access channel, and several voice channels. The control channel is selected or dedicated to receive requests for service from mobiles and portables, to page selected mobiles or portables, and to instruct the mobiles or portables to tune to a predetermined voice channel where a conversation may take place. Accordingly, the control channel is normally responsible for receiving and transmitting data to control the communication actions of the mobile and portable radiotelephones.

The control channel normally comprises a FOCC for communications from the MSC to a radiotelephone unit and a reverse overhead control channel (RECC) for communications from a radiotelephone unit to the MSC. The FOCC supplies a multiplexed data stream of message data words, a busy idle signal, and busy idle bits. The busy idle bits are useful for supplying an indication to monitoring radiotelephones about the current status of the RECC. If the RECC is in use by a radiotelephone unit, then the RECC is considered to be busy and the busy idle bit is set to a binary one value. Alternatively, if the RECC is not in use, then the RECC is considered to be idle and the busy idle bit is set to binary zero value. Mobile radiotelephones monitor the busy idle bits transmitted by the FOCC and, if the busy idle bit is set to a binary one value, then the mobile radiotelephone delays transmission on the RECC until the busy idle bit is set to a binary zero value. Thus, a radiotelephone normally transmits on the control channel during the window of opportunity that is presented by a transition from the busy state to the idle state. In particular, the busy idle bit supplies an instantaneous view of the signaling activity on the control channel, and the conventional radiotelephone is responsive to this instant snapshot of control channel activity.

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., USA 20006.

It is known that when a cellular mobile radiotelephone originates a call, it transmits a series of data messages to the serving cell. These messages, commonly referred to as Call Origination, are defined by EIA/TIA-553. These data messages contain the low order seven digits of the unit's telephone number, known as the Mobile Identification Number (MIN), the unit's Station Class Mark (SCM), which identifies functional characteristics of the unit, and the Called Address, or dialed telephone number. Cellular system operators typically also require additional data words to be transmitted that contain the MIN2, which is the high order three digits or NPA of the cellular unit's telephone number, and the Electronic Serial Number (ESN). The MIN is assigned to a particular radiotelephone unit by the cellular service provider selected by the subscriber. The MIN typically contains information unique to the CMR system operator, for example, the first three digits of the MIN ("XXX") typically correspond to an area code, the next three digits ("XXX") typically correspond to a geographic location within the area code; and the final four digits ("XXXX") identify a particular piece of equipment. Similarly, the ESN is unique to each mobile cellular radiotelephone unit, and comprises a format that allows differentiation as to manufacturer and; in some cases, the model number, date of manufacture, and the like.

These messages are provided first to the cell, and then through a data link to a mobile telephone switching center, otherwise described as a mobile switching center. The MSC, also known as a MTSO or a "switch," makes voice connections between mobile radiotelephones and other telecommunications networks. At the MSC, a determination is typically made whether the radiotelephone is an authorized user or subscriber by looking up the unit's telephone number, serial number, and other information supplied by the radiotelephone to see if there is an entry in the MSC's database corresponding to that particular telephone. An optional function of an MSC is to validate that the ESN and MIN received as part of a Call Origination message are valid. If the MIN is valid and the radiotelephone is identified as a subscriber within the given cellular system, i.e., a "home" unit, the received ESN is compared to the MSC's database ESN entry to detect fraud. If these checks succeed, the cellular call is then allowed to proceed.

It is also well known that when a mobile radiotelephone first powers up or first enters a CMR system when already powered, the unit can identify itself as actively present within the system. The radiotelephone identifies itself or "registers" through a process known as Autonomous Registration by supplying a data packet similar to that of a Call Origination message. The Autonomous Registration signal, also referred to as a registration or identification signal, typically comprises data fields for at least a mobile telephone number, i.e., the MIN, and an ESN. The original design attempt of Autonomous Registration was to improve the efficiency of potential future call deliveries by keeping the MSC informed of the approximate whereabouts of each individual radiotelephone unit, and to reduce paging channel load by lessening the need to page all cells to find a particular cellular unit. When the MSC is thus informed, it can later "page" or attempt to ring the cellular unit only in the cell or area that it was last known to be in. Additional cells would be paged only if the initial page did not locate the particular radiotelephone. Thus, Autonomous Registration is simply a set of messages periodically and autonomously sent from the mobile radiotelephone to the serving cell at an interval specified in data parameters previously received from the cell by the cellular unit.

Referring now to the drawings, in which like numerals indicate like elements throughout the various figures, FIG. 1 illustrates a data message system 10 operating within a CMR system 8. Referring to FIG. 1, the data message system 10 supports the collection and communication of data to a central data collection site by reporting systems associated with numerous data sources. By operating within the environment of the CMR system 8, which is well adapted for portable or mobile communications, the data message system 10 takes advantage of an existing wide area communications network and avoids the expense of communicating with each remote data site via a dedicated conventional telephone facility or conventional two-way radios. Numerous communications applications are available for the data message system 10, including communicating data collected from a wide variety of data sources, such as utility meters, community antenna television (CATV) pay-per-view (PPV) terminals, equipment operating at isolated sites, and security alarm systems.

The data message system 10 adapts the existing environment of a CMR system to communicate data from one or more remote sites to a central location. However, to conserve the use of voice channels of the CMR system for conventional telephone conversations, the data message system 10 uses the cellular network control channel of the CMR system for data communications. This permits conservation of the valuable frequency spectrum dedicated to the voice channels of the typical CMR system.

A typical CMR system includes a geographic radio service area, such as indicated by the cell 12, of which a plurality of cells are typically provided in a typical cellular service operator's system. The cell 12 is served by a broadcast antenna 14 to permit communications between cellular mobile radiotelephones operating within the cell 12 and a cell control 16. A mobile telephone switching office, such as the MSC 24, can communicate with the cell 12 either by dedicated telephone facilities (not shown) or, more frequently, by a cell-to-mobile switching center data link 22 between the cell control 16 and the MSC 24. At least a portion of the data link 22 is typically supported by a wireless communications link, such as the microwave link 20, located between the cell 12 and the MSC 24.

It is well known to those skilled in the art that the conventional CMR system comprises at least one mobile telephone switch coupled to an appropriate array of more or less identically equipped cell sites 12. The MSC 24 normally couples telephone conversations involving mobile radiotelephones operating in the cell 12 to the public switched telephone network (PSTN) 26 through telephone facilities 28. The data message system 10 includes a set of data reporting devices 29, each comprising at least one controller 32' and a cellular communications device 34. A cellular communications device 34 can communicate with the MSC 24 via a control channel of the CMR system. The controller 32', which is connected to one or more instruments or controllable items via a signal path 31', is typically implemented as a PLC for controlling the operations of a field instrument or a controllable item. The cellular communications device 34, which is connected to the controller 32' via a signal path 33', can communicate with the MSC 24 via a cellular network control channel 38 and accept page messages containing commands and/or data for use by the controller 32'. In addition, the cellular communications device 34 can transmit data messages, typically formatted as a Call Origination message or an Autonomous Registration signal, to the MSC 24 via the cellular network control channel 38.

In the alternative, the data reporting device 29 can include a monitor 32, shown in FIG. 3, which is operative to collect selected data from one or more remote data sources 30. The monitor 32 obtains and records selected data directed to the operation or performance characteristics of each data source 30. In turn, the cellular communications device 34, which is connected to the corresponding monitor 32 via a signal path 33, prepares a data packet containing the selected data and transmits the packet as a data message. The selected data represents actual data acquired by the monitor 32 in response to monitoring the operation or performance of the data source 30. Alternatively, the selected data can represent predetermined data or a preprogrammed message that is associated with the detection of a certain event by the monitor 32 for the data source 30.

The MSC 24 can communicate with the cellular communication devices 34 via the cellular network control channel 38, which is formed by the combination of the data link 22 and a cellular communications link 36 between the broadcast antenna 14 and the cellular communications device 34. This combination of communications links is collectively referred to as the control channel. It is well known that a cellular network control channel for a conventional CMR system comprises two radio channels that are commonly described as a FOCC 38a and a RECC 38b. The FOCC 38a is used for communications initiated by the MSC to a radiotelephone unit, such as the cellular communications device 34. In contrast, the RECC 38b is used for communications from a radiotelephone unit to the MSC 24. The communications operations of the data message system also use this convention for communications between the MSC 24 and the cellular communications device 34. In particular, the control channel 38 comprises two separate data communications paths, an FOCC 38a for communications initiated by the MSC 24 and an RECC 38b for communications initiated by the cellular communications devices 34 (or mobile radiotelephones operating within the cell). Accordingly, the cellular communications device 34 transmits data messages via the RECC 38b, whereas the MSC 24 transmits page messages, typically comprising commands and/or data, via the FOCC 38a.

In this manner, the MSC 24 can transmit command and data to each of the cellular communication devices operating within the coverage areas of an array of cells for the CMR system 8. Likewise, the MSC 24 can receive data messages from each of those cellular communications devices 34. Although the data messages contain selected data rather than the parameters normally contained in an actual radiotelephone control information, the MSC 24 will operate upon the data messages as if they were transmitted by a conventional radiotelephone operating within the cell because the data messages are formatted to appear as a registration signal or a call origination signal generated by a radiotelephone unit.

The MSC 24, in response to a data message transmitted by a data reporting device, can conduct one or more of the following operations: store the data message for processing at a later date, process the selected data supplied by the data message, or forward the data message to a data collection system 40 via a first communications link 42. The data collection system 40, which is connected to a memory storage device 44, collects the selected data by storing the received data messages within the memory storage device 44. Similar to the MSC 24, the data collection system 40 also can process the selected data to obtain further information concerning the operation or performance of the data sources 30. Alternatively, the data collection system 40 sends the data message to a data processing system 46 via a second communications link 48. The data processing system 46 is typically remotely located from the data collection system 40 and facilitates convenient processing of the selected data at a central site. The second communications link 48 is typically implemented by a conventional telephone facility, a dedicated data link, or by a wireless communications link.

Referring still to FIG. 1, in response to the transmission of a data message by a cellular communications device 34, the MSC 24 typically makes a determination whether the cellular communications device 34 that transmitted the data message is an authorized user or subscriber of the services offered by the cellular system 8 or another system. As shown in FIG. 2 and described below with respect to the data message format, the data message preferably includes certain information that identifies the cellular communications device 34 as a radiotelephone that normally operates within a certain remote or foreign cellular system. Based upon this information, the MSC 24 decides that the cellular communications device 34 is a "roamer" because it appears to be affiliated with the cellular service offered by another cellular system, which, in this case, is the remote cellular system. In particular, the MSC 24 maintains a list or database that identifies the certain information in the data message as belonging to a particular cellular system and, by checking this database, determines whether the cellular communications device 34 is a subscriber or a roamer. Thus, it will be understood that the MSC 24 interprets the data message as a transmission from a roaming mobile radiotelephone operating within the CMR system 8.

The remote cellular system identified by the data message is not an actual operating cellular system for supporting telephone conversations, but rather is dedicated to data collection applications and is represented by the data collection system 40. In recognition that the cellular communications device 34 is actually associated with the remote cellular system, the MSC 24 forwards the data message to the data collection system 40 via the first communications link 42. The data collection system 40 responds by sending to the MSC 24 a message which confirms that the roamer associated with the data message is a valid or authorized user of the remote cellular system. The cellular communications device 34 is thereafter added as a registered radiotelephone to a database of registered roamers at the MSC 24.

The data collection system 40 has now received the data message containing selected data. Accordingly, the data collection system 40 transmits a message to the MSC 24 that instructs the MSC to delete the cellular communications device 34 from its list of registered roamers. It will be understood that the MSC 24 would normally receive this type of message when a roaming radiotelephone has moved to another cellular system and subsequently registered for operation on that other system. Thus, the database of the MSC 24 is no longer required to maintain the registration information concerning the cellular communications device 34 after transferring the data message to the data collection system 40.

Alternatively, the MSC 24 clears its database of such registration information upon the expiration of a certain time interval. The data collections system 40 can respond to the data message by transmitting a message which confirms that the roamer is a valid user and further instructs the MSC 24 to delete the registration entry upon the expiration of the certain time interval. As a separate option, the MSC 24 can automatically delete a registration entry from the MSC database upon expiration of a certain time period without any instruction from the data collection system 40. In this manner, the data collection system 40 is not required to send yet another message to the MSC 24 after the data collection system 40 confirms that the cellular communications device 34 represents a valid user.

The MSC 24 and the data collection system 40 are preferably compatible with the EIA/TIA Interim Standard 41 (IS-41 standard). The IS-41 standard defines a communications protocol for communications between two cellular systems. The IS-41 standard allows cellular calls to be handed-off between dissimilar cellular systems, not unlike the way that calls are handed-off between cells of a single CMR system. In addition, the IS-41 standard permits call deliveries and a communications exchange for verifying whether a cellular caller is a valid cellular service subscriber. In this manner, the MSC 24 hands-off or forwards the data message to the data collection system 40 via the first communications link 42, which is preferably implemented as an IS-41-compatible network. In response, the data collection system sends a user validation message via the link 42 to confirm that the source of the data message, specifically a cellular communications device 34, is a valid cellular source.

In particular, the data collection system 40 recognizes that the received data message contains selected data which has been transmitted by a cellular communications device 34. Accordingly, the data collection system 40 processes the received data message and compares the predetermined identifying characteristic in its data message to a list of such characteristics in its database. This database preferably contains an entry of the predetermined identifying characteristic for each of the known cellular communications devices 34 and corresponding data that identifies the associated device as a valid cellular source. Upon obtaining a positive match, the data collection system 40 preferably responds to the received data message by sending to the MSC 24 the verification message. It will be appreciated that the data collection system 40 also can forward to the MSC 24 a message confirming the absence of a valid entry for the cellular communications device 34 in response to a negative match.

This validation message can also include a profile of communications services that are authorized for use by the particular cellular source. For example, this user profile typically defines the operations limitations for the cellular source, including access to long distance services, the capability for the source to only originate (and not receive) calls via the cellular system, etc. The user profile information can contain an instruction that commands the MSC 24 to delete from its database the registration entry for the particular cellular communications device after the expiration of a certain time period. This allows the MSC 24 to clear from its database entries for cellular communications devices 34 that have communicated their data message via the cellular system 8 by registering with the MSC 24 because such devices no longer require the continued communications support of the MSC 24.

The data collection system 40 can store the selected data supplied by the received data message within the memory storage device 44, can process the selected data and store the resultant data, or can forward the selected data to the data processing system 46 for processing. Prior to sending the selected data to the data processing system 46, the data collection system 40 first converts the data message to an acceptable communications protocol for conveying the data message to the data processing system 46. This step is necessary prior to communication with the data processing system 46 because, unlike the MSC 24 and the data collection system 40, neither the data processing system 46 nor the second communications link 48 are compatible with the IS-41 standard.

Although the MSC 24 is typically programmed to treat the cellular communications devices 34 as roamers associated with a foreign cellular system, it will be appreciated that the database of the MSC 24 also can be programmed to contain entries for the predetermined identifying characteristics of those cellular communications devices 34 operating within the cells of the cellular system 8. Upon receiving a data message via the control channel 38 from such a device 34, an MSC 24 containing such database entries will identify the transmitting cellular communications device 34 as a "home" unit rather than as a roamer because the MSC database contains an entry that corresponds to the predetermined identifying characteristic supplied by the message. Thus, the MSC 24 registers the transmitting cellular communications device 34 as a home unit of the cellular system 8. This avoids the additional requirement of contacting a foreign cellular system, such as the data collection system 40, to inquire whether this cellular source is a valid user or subscriber of cellular services.

However, to, initiate the necessary transfer of the information in the data message to the data collection system 40, the MSC 24 for this embodiment is adapted to recognize that data messages should still be forwarded to the data collection system 40. Specifically, based upon a portion of the predetermined identifying characteristic that is uniquely associated with the data collection system 40, the MSC 24 locates an entry in its database that commands the switch to send all messages containing such a characteristic to the data collection system 40. Accordingly, the MSC 24 thereafter forwards the data message via the first communications link 42 to the data collection system 40.

The data collection system 40 can be implemented by a computer. One embodiment for the data collection system 40 is the computer of a service circuit node. Certain manufacturers of switches, such as the MSC 24, also offer devices for implementing communications with the data collection system 40, including the Motorola EMX switch and other vendor proprietary switches. The cellular system 8 is preferably implemented as an AMPS or a DAMPS cellular system. However, it will be appreciated that the cellular system 8 also can be compatible with alternative cellular systems, such as the GSM system, implementing a control channel for mobile-to-cell communications.

It will be appreciated that the CMR system 8 includes an array of cells, such as the cell 12, and that a set of reporting systems 29, each formed by the monitor 32 and the cellular communications device 34, are typically located in a cell. For each data source 30 within the cell 12, the monitor 32 (controller 32') and the cellular communications device 34 are preferably located proximate to the data source 30 (instrument 30') to minimize the lengths of the signal paths. To facilitate economical installation of the reporting device, the monitor 32 (the controller 32') and the cellular communications device 34 can be combined within the same housing and this housing can be installed either adjacent to or as an integral part of the data source 30 (instrument 30'). For an installation proximate to the data source 30 or a controllable instrument 30', the signal paths are preferably formed by hard-wired connections between the connected devices. Nevertheless, it will be appreciated that the signal paths also can be implemented as either infrared communications links or wireless communications links.

The data collection system 40 can be located proximate to or as an integral part of the MSC 24, in which case the first communication link 42 preferably forms a hard-wired connection between the devices. However, the data collection system 40 also can be positioned at a remote site. For this remote installation, the first communications link 42 can be implemented as a wireless communications system, such as a microwave system, or as a dedicated data line, such as a conventional telephone facility. For the convenience of the party that is sponsoring the collection of a particular type of data, the data processing system 46 is typically located at another remote site that is typically proximate to the sponsoring party.

FIG. 2 is a diagram that shows the format for the data message that is communicated by the data message system 10. Referring now to FIGS. 1 and 2, a data record 50 for the data message contains both a data field 54 for the selected data acquired from the remote data source 30, and a data field 52 for a predetermined identifying characteristic which uniquely identifies the cellular communications device 34 that initiates the transmission of the data message. To take advantage of the existing architecture of a CMR system 8, the format for the data message preferably is identical to the message format (or data record) for an identification signal that is transmitted by a cellular radiotelephone when it first identifies itself to a CMR system, such as the CMR system 8.

By using the data message format associated with an Autonomous Registration signal, the cellular communications device 34 "registers" with the MSC 24 by sending a data message that appears to contain a mobile telephone number and an ESN. Although it is not intended for the cellular communications device 34 to place a conventional voiced-based cellular telephone call, the cellular communications device 34 nevertheless registers for operation with the MSC 24, thereby enabling the communication of the selected data from the field.

Alternatively, the format for the data message can be identical to the format or data record for a Call Origination signal that is transmitted by a cellular radiotelephone when it originates a telephone call. Similar to the format for a registration signal, the cellular communications device 34 can appear to originate a call by sending a data message formatted as a Call Origination signal to the MSC 24. Although the MSC 24 processes the data message as if it contained a mobile telephone number and an ESN, the data message is actually used to communicate selected data placed within one or more data fills normally reserved for the mobile telephone number and the ESN. Although the Call Origination signal format can be used to transport data from the cellular communications device to the MSC, it will be understood that the data message system 10 is employing this format for data communication rather than for call origination.

As shown in the data record 50 in FIG. 2, the standard message format for a registration signal (call origination) has been adapted by the data message to permit the identification of the particular transmitting cellular communications device 34 and the communication of the selected data. In particular, the data field 52 for the predetermined identifying characteristic corresponds to at least a portion of a mobile telephone number or MIN assigned to the cellular communications device 34. Thus, the predetermined identifying characteristic is substituted within the data field normally reserved for the MIN in an identification signal. This predetermined identifying characteristic can belong to a set of unassigned mobile telephone numbers. Alternatively, the predetermined identifying characteristic assigned to each cellular communications device 34 can be a conventional telephone number or a set of 10 digits. The predetermined identifying characteristic permits the identification of the source of the data by uniquely identifying the cellular communications device 34. The predetermined identifying characteristic also supplies information used by the MSC 24 to recognize that the data message containing this predetermined identifying characteristic is associated with the data collection system 40.

Furthermore, the data field 54 in the data message for remote data corresponds to the location within the data record for the ESN. Those skilled in the art will appreciate that the ESN is 32 bits long and includes 8 bits for a manufacturer code. For cellular systems that do not review or screen ESNs based upon the manufacturer code segment, it is possible to manipulate the data field normally filled by an ESN to supply a data message having a data field 54 containing 32 bits of selected data. However, if the cellular system uses the manufacturer code segment of the ESN, the selected data within the data field 54 comprises a length defined by the remaining 24 bits of the ESN. For most applications, it will not be necessary to manipulate the manufacturer's code segment of the ESN because a data message having 24 bits of selected data (and, as required, 8 bits of the manufacturer code segment for a conventional ESN) should be sufficient to supply relevant data.

FIG. 3 is a block diagram that illustrates the components of an exemplary reporting system 29 operable for data monitoring and collection applications, namely the monitor 32 and the cellular communications device 34. Referring now to FIGS. 1 and 3, the monitor 32 includes a recorder 60, a memory 62, and one or more sensors 64. The recorder 60, which is connected to the data source 30 via the signal path 31, uses the sensors 64 to detect certain operating or performance characteristics of the data source 30. The detected characteristics represent selected data that are preferably stored within the memory storage device 62. The memory 62 is preferably random access memory (RAM). However, it will be understood that the memory 62 also can be implemented by other types of data storage devices, including flash memory, a flexible diskette, a computer hard disk or an optical disk.

It will be appreciated that the signal path 31 represents one or more signal channels for transferring the selected data to the recorder 60 and, furthermore, that the recorder 60 can be implemented as either a single or multi-channel recording device. Each signal channel normally would be associated with a different operating or performance characteristic for the data source 30.

For certain applications, the recorder 60 records selected data from the data source 30 for a predetermined time period. A clock 66 connected to the recorder 60 supplies timing data to the recorder 60, thereby enabling the recorder 60 to add a time tag to the selected data. The time tag indicates the relative time for the start of each predetermined time period of recording operations. Assuming that the predetermined time period is a known value, the addition of the time tag data permits the calculation of the start and completion times for each data reporting operation. Correlation of the data collection time to the selected data is desirable for certain processing operations. The clock 66 can be implemented as a conventional counter supplied by a hardware device or as a software routine executed by a microprocessor.

The cellular communications device 34 includes at least a data receiver 70, a cellular transmitter 72, and a controller 74. The data receiver 70, which is connected to the recorder 60 via the signal path 33, receives the selected data obtained from the data source 30 by the monitor 32. The controller 74, which is connected to the data receiver 70 and the cellular transmitter 72, controls the respective operations of the data receiver 70 and the cellular transmitter 72. The controller 74 is preferably a microprocessor-based control system that can be programmed to conduct control operations in a manner known to the art.

In response to the selected data, the controller 74 prepares a data packet containing the predetermined identifying characteristic associated with the cellular transmitter 72 and the selected data collected from the data source 30. The cellular transmitter 72 responds to the data packet by transmitting a corresponding data message via the control channel 38 of the CMR system 8. Specifically, the cellular transmitter 72 uses the RECC of the control channel 38 to send data messages to the MSC 24. Although the cellular transmitter 72 can be implemented as a conventional transmitter for a radiotelephone unit, the preferred cellular transmitter 72 uses only the data radio channels of the CMR system 8 for transmission of data messages.

The cellular communications device 34 further includes a memory storage device 76 connected via a bi-directional data path to the controller 74. The selected data received by the data receiver 70 can be stored in the memory storage device 76 prior to the transmission of a data message by the cellular transmitter 72. Although the memory storage device 76 is shown as a separate memory from the memory storage device 62, it will be appreciated that the memory storage devices 62 and 76 can be implemented as a single memory which is accessible by both the recorder 60 and the controller 74. The memory storage device 76 can include one or more masks, as shown in FIG. 3, for storing identifiers assigned to the cellular communications device 34. As will be described in more detail below with respect to FIG. 5, each specific identifier is typically numeric data formatted as a cellular telephony MIN. The MSC 24 can issue a page containing a specific identifier assigned to a cellular communications device 34 to initiate a communication via the FOCC with that particular device. Those skilled in the art will appreciate that the masks in the memory 76 can store other forms of data, including characteristics for a variety of communication operations supported by the cellular communications device 34.

To connect the cellular communications device to another device, such as a monitor 32, a signal path is connected between both devices, as illustrated by signal path 33 in FIG. 3. The signal path 33 can be implemented as a conventional data communication link compatible with known protocols, including the RS-232 serial protocol. To support an exchange of data between both devices, the signal path 33 is preferably a bi-directional signal path. In addition to the external port connected to the signal path 33, the cellular communications device 34 can include other external data ports. These additional data ports can be connected directly to the controller 74, a data receiver and/or transmitter, or a memory storage device. For example, an external port can be used to program the cellular communications device 34 prior to field operations. Alternatively, an external port can be used to output data from the cellular communications device 34 to another device. It will be understood that the cellular communications device 34 is not limited to the single external port shown in FIG. 3, and can include additional external ports as required to support various applications.

To receive communications from the MSC 24 via the FOCC of the cellular network control channel 38, the cellular communications device 34 also includes a cellular receiver 78. The cellular receiver 78, which is connected to the controller 74, can be implemented as the cellular receiver for a conventional radiotelephone. However, similar to the cellular transmitter 72, the preferred cellular receiver 78 operates to receive information primarily via the data radio channels rather than the voice radio channels of the CMR system.

The cellular transmitter 78 typically transmits the data message only when the control channel is available for clear use by the cellular communications device 34. This form of data queuing minimizes the possibility that the operation of numerous cellular communications devices 34 within the cell 12 will interfere with normal telephone conversations involving the operating radiotelephones within the cell. Nevertheless, it will be appreciated that the cellular transmitter 78 also can transmit the data message without first checking the availability of the control channel 38.

Alternatively, the cellular communications device 34 can be programmed to transmit the data message during a certain time interval, such as during the early morning hours between midnight and 6 AM, when control signal traffic is normally at a minimal level. To permit this type of automated transmission operation, the cellular communications device 34 includes a clock 82 connected to the controller 74. The clock 82 outputs a clock signal in response to expiration of a time interval. In response to the clock signal, the controller 74 initiates a data message transmission by the cellular transmitter 72. In this manner, selected data is transmitted during a known time interval from one of the reporting devices within the cell 12 to a central location.

The clock 82 preferably outputs the clock signal during the time period when use of the control channel 38 is at a reduced level, thereby minimizing the possibility that the cellular communications device 34 will interfere with the normal communications operations of the CMR system 8. In particular, the time interval is preferably selected with advance knowledge of the reduced activity periods for conventional telephone conversation traffic on the CMR system 8 to ensure that data message transmissions by the various cellular communications devices 34 in the cell 12 are conducted on a noninterference basis with voice call processing messages transmitted to and from the radiotelephones operating in the cell. The clock 82 can be implemented as either a hardware counter or as a software counter implemented by coded instructions executed by the controller 74.

A data transmission by the cellular communications device 34 also can be initiated in response to a status signal output via the signal path 33 by the monitor 32. This status signal causes the cellular communications device 34 to transmit the stored selected data via the RECC of the control channel 38. The monitor 32 typically outputs the status signal in response to the completion of a data recording event. For example, in a typical vending equipment application, the monitor 32 can output the status signal in response to an alarm event, such as the detection of a maintenance service requirement. Alternatively, for an utility load management application, the monitor 32 can output the status signal in response to detection of possible tampering of the utility's load control device. Those skilled in the art will appreciate that the generation of the status signal is event-driven and that the applications for the data message system 10 will determine those events.

It will be appreciated that the process of outputting a clock signal or a status signal to initiate a data message transmission by the cellular communications device 34 is similar to an Autonomous Registration operation that is conducted by certain known radiotelephone units. For an Autonomous Registration, the radiotelephone automatically identifies itself to the cellular system by initiating its own registration operation. Likewise, for the described embodiments, the cellular communications device 34 responds to the clock signal or the status signal by sending a data message having a message format that is representative of the data record for a registration signal (Call Origination signal) of a radiotelephone unit. In turn, the MSC 24 receives the data message via the control channel 38 and subsequently operates upon the data message as if it were a registration signal (call origination signal) transmitted by a conventional radiotelephone unit.

It is well recognized that a cellular network control channel, such as the control channel 38, is a two-way communications path between the MSC 24 and the radiotelephone devices operating in the cell 12. Specifically, an MSC 24 can send a paging message or "page" to one or more radiotelephone devices operating within the coverage area defined by the cell 12 of the CMR system 8. In contrast to conventional radiopaging systems, this page message is transmitted via the FOCC of the CMR system rather than via a radiopaging terminal. For CMR systems, this page message is typically used to notify a cellular mobile radiotelephone device that an incoming telephone call is pending, thereby prompting the cellular device to register with the CMR system.

The receiver 78 can receive pages from the MSC 24 via the FOCC of the control channel 38. For example, the MSC 24 can output command signals, which are formatted as pages, via the control channel 38 to initiate certain operations or to control certain functions of one or more of the cellular communications devices 34 within the cell 12. The receiver 78 can monitor the control channel 38 for finite time periods defined by a clock signal output by the clock 82. For example, the clock 82 can operate as a timer defining a time period for a monitoring operation completed by the receiver 78. The cellular communications device 34 can respond to a command signal by conducting a particular operation or by controlling a certain function associated with the command signal.

The command signals typically include address data and each cellular communications device 34 responds to a command signal containing its predetermined address data. This allows the MSC 24 to communicate with one or more of certain cellular communications devices 34. By proper use of the addressing operation, it is possible for the MSC 24 to remotely control the operations or functions of a subset of the cellular communications devices 34 that is selected from the overall group of devices 34 within the cell 12.

The command signal is preferably a 10 digit number that represents a conventional mobile telephone number. At least a portion of this telephone number can be assigned as an identifier for a corresponding cellular communications device 34. The remaining portion (if any) of the 10-digit telephone number can represent a command or data for a particular operation or function. In this manner, a cellular communications device 34 can be programmed to respond only to a command signal containing its address data and to conduct the particular operation or function identified by the command.

By transmitting command signals to the cellular communications devices 34, the MSC 24 can remotely control various operations of the cellular communications devices 34 or can remotely define various programmable operating parameters of the devices 34. For example, in response to a selected command signal, the cellular communications device 34 "registers" with the MSC 24 by transmitting a data message to the MSC 24. It will be appreciated that this command signal is similar to a conventional Locate Request signal generated by a CMR system, such as the AT&T Autoplex System, and requests registration of a selected radiotelephone unit. By use of this command signal, a selected cellular communications device 34 can be polled at any time by the MSC 24 to initiate the transmission of a data message containing the desired selected data.

For another representative example, the time interval for the clock 82 can be modified or otherwise replaced with a substitute time period in response to a command signal. The cellular communications device 34 also can instruct the monitor 32 to initiate a recording of data from the remote data source 30 in response to yet another command signal. In particular, the controller 74 responds to the detection of the command signal by the cellular receiver 78 and outputs an instruction signal to the recorder 60 to prompt the data reporting operation.

The opportunity for placing a command or data, or a combination of a command and data, within the conventional format of a paging message is limited by the defined character length of the paging message, typically the 10-digit telephone number or MIN. For relatively short data lengths, the transmission of a single independent page message from an MSC to a cellular device in the manner known to the art is useful to support limited communications. This fixed data length for a page message is satisfactory for the paging communication task of conventional CMR system operations, namely, the polling of one or more mobile radiotelephones within the coverage area of the CMR system. This polling technique only requires the transmission of a single discrete page message to prompt a response from a mobile radiotelephone unit that receives the page. Prior to the present invention, there was no readily available mechanism for exploiting the paging message mechanism to transfer an expanded data set.

Figure 4:
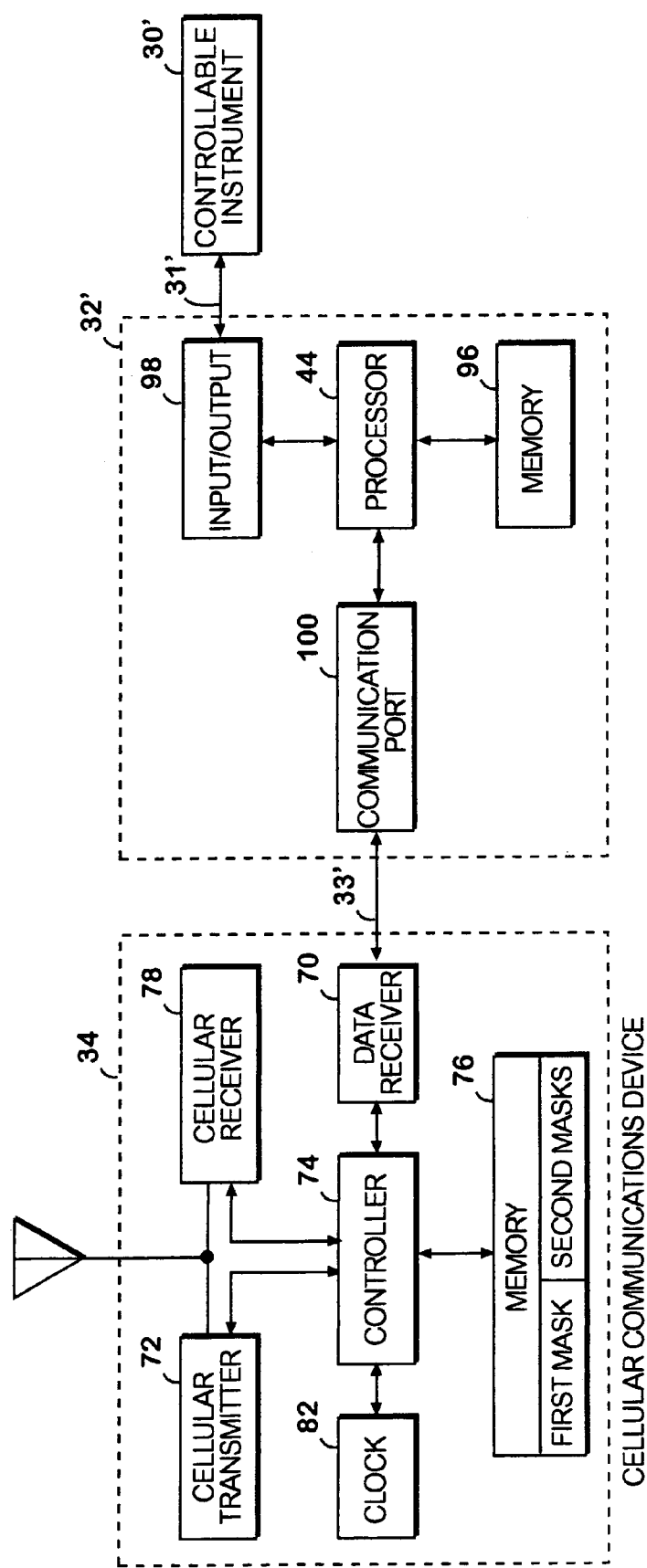
FIG. 4 is a block diagram of an alternative embodiment of the data reporting system illustrated in FIG. 1

As described in U.S. Pat. No. 5,873,043, a data message system can be constructed to communicate multiple page messages or pages via the cellular network control channel to a cellular-compatible receiving device. The data obtained from each received page can be combined to form an aggregate message comprising a data sequence. An exemplary data reporting system 29 can be constructed to support the transfer of commands and/or data via pages carried via the FOCC for use by a controller, such as a programmable logic controller device. Turning now to FIG. 4, this embodiment of the data reporting system 29 includes a controller 32' and a cellular communications device 34. The controller 32' comprises a processor 94, a memory 96, an input/output 98 and a communication port 100. The processor 94 controls the operations of the controller 32' based on instructions and data maintained in the memory 96. The memory 96 typically contains a control schedule in the form of a look-up table that defines the control operations of the controller 32' for one or more control applications associated with the controllable instrument 30'. The input/output 98 support communications between the processor 94 and the controllable instrument 30'. The communication port 100, typically a serial port, provides a communications path between the processor 94 and the cellular communications device 34. The controller 32' is coupled to the controllable instrument 30' via a signal path 31' and to the cellular communications device 34 via a signal path 33'. The controller 32' can be implemented by a conventional PLC capable of receiving instructions and data from the cellular communications device 34. The cellular communications device 34 can receive this content from the MSC 24 in the form of paging messages via the cellular network control channel 38.

An exemplary format for a page message capable of communicating a command and/or data to a cellular communications device is described in U.S. Pat. No. 5,873,043. For an exemplary embodiment of the data message system 10, it will be appreciated that command and/or data digits can be encoded within a series of pages transmitted by the MSC 24 over the FOCC. For example, the Least Significant Digit (LSD) of a MIN in a page can be used to indicate an associated action to take on the FOCC DATA. This format requires a 1K block of MINs, for example, 0XX-100-0000 to 0XX-100-0999. Five decimal digits of data can be encoded into two data pages. Each of the data digits are encoded according to Table 1, below, which is zero-based right to left, but stored in the FOCC page left to right.

TABLE 1

| Data digits positions are numbered right to left, 0-based | | | | |
|---|---|---|---|---|
| 4 | 3 | 2 | 1 | 0 |

Table 2 describes the relationship between the LSB of a MIN and the digits of FOCC DATA, including the function corresponding to that data.

TABLE 2

| MIN LSD | Digits of FOCC DATA | Function |
|---|---|---|
| 0,1 | 0,1 | Add 0 to LSD of Second Page in Sequence of Two Data Pages |
| 2,3 | 0,1 | Add 1 to LSD of Second Page in Sequence of Two Pages |
| 4,5 | 2,3,4 | Data |
| 6,7 | 0,1 | Single Data Page |
| 8,9 | Reserved for future use | Reserved for future use |

Figure 5A:
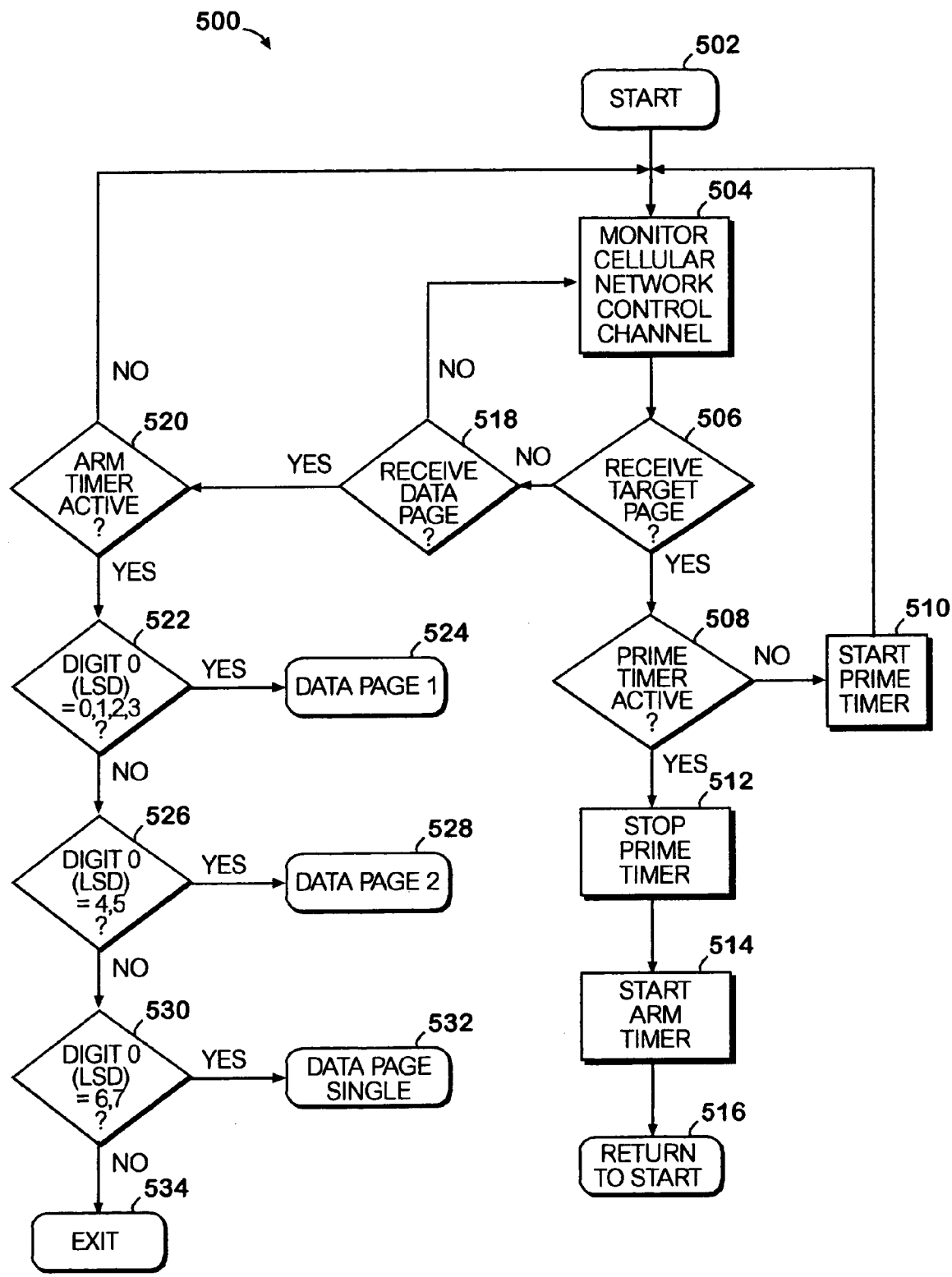
FIGS. 5A, 5B, 5C, 5D and 5E, collectively described as FIG. 5, are logical flow diagrams illustrating the steps for communicating commands and/or data by sending a set of paging messages in accordance with an exemplary embodiment of the present invention.

FIGS. 5A, 5B, 5C, 5D, and 5E, collectively described as FIG. 5, are logical flow chart diagrams illustrating a computer-implemented process for communicating programming information to a controller coupled to a cellular communications device in a CMR system in accordance with an exemplary embodiment of the present invention. Turning first to FIG. 5A, an exemplary programming process 500 is initiated at the START step 502 and proceeds to a monitoring step 504. In step 504, a communications device, such as the cellular communications device 34, monitors the cellular network control channel for page messages issued by the MSC of the CMR system. For example, the cellular communications device can monitor the FOCC for one or more target pages containing a specific identifier assigned to that communications device. In the event that the cellular communications device receives a proper sequence of target pages containing a matching specific identifier, the communications device can respond by initiating a communications activity, such as a monitoring operation for a data page carrying programming content.

In decision step 506, an inquiry is conducted to determine whether the cellular communications device has received a target page with a specific identifier matching one assigned to the device. If the response to this inquiry is positive, the "YES" branch is followed to step 508. A negative response to this inquiry results in the process following the "NO" branch from step 506 to step 518.

In step 508, a determination is made whether a prime timer at the cellular communications device is active. If the prime timer is not active, the "NO" branch is followed to step 510 and the timer is activated. Otherwise, the "YES" branch is followed from step 508 to step 512 and the prime timer is stopped. For the exemplary process 500, the prime timer completes a timing operation for a period of 60 seconds upon activation unless interrupted during that time period. For example, the prime timer can be interrupted in step 512 in response to receiving a second target page within the time period of the prime timer. In contrast, the prime timer will be activated in step 510 in response to receipt by the cellular communications device of a first target page in a sequence of a pair of target pages.

In step 514, a separate timer, the ARM timer, is started and a predetermined time period, typically 60 seconds, is begun. In step 516, the process returns to the START step 502 to initiate continued monitoring operations by the cellular communications device.

If a target page is not received in step 506, an inquiry is conducted in decision step 518 to determine whether the cellular communications device has received a data page. If the response to this inquiry is negative, the "NO" branch is followed from step 518 to step 504 to continue monitoring operations. Otherwise, the "YES" branch is followed from decision step 518 to step 520. A determination is made in step 520 whether the ARM timer is active. If so, the cellular communications device has received a pair of target pages, each having a matching identifier, during the time period of the prime timer. The process proceeds to step 522 based upon a positive response to the inquiry in step 520. If, on the other hand, the ARM timer is not active, the process returns to step 504 to continue monitoring operations by the cellular communications device.

If the ARM timer is active, the cellular communications device is monitoring the FOCC for one or more data messages transmitted by the MSC of the CMR system. In step 522, a determination is made whether the received page represents a first data page in a sequence of data pages to be received by the cellular communications device. For the exemplary process, the first data page is designated by the placement of a 0, 1, 2, or 3 in the minimum LSD of the MIN structure of the page message. If the received page is the first data message, the "YES" branch is followed from step 522 to step 524 to process the first data message. Otherwise, the "NO" branch is followed from step 522 to step 526.

Figure 5B:
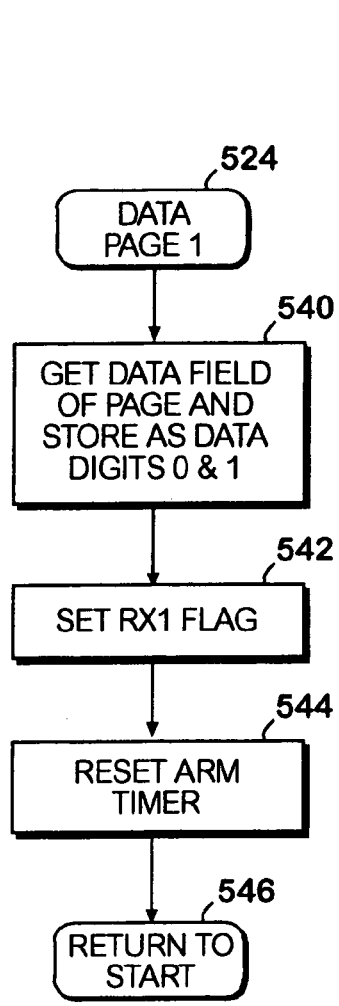

FIG. 5B is a logical flowchart diagram illustrating the sequence of steps completed by a exemplary process for processing a first data page. Turning briefly to FIG. 5B, the first data page, shown as "Data Page 1" in step 524, is processed by the cellular communications device. In an exemplary process 524, the data field of the first data page is extracted and the data is stored as data digits 0–1 by the cellular communications device. These data digits can be stored in big-endian order within local memory of the device. In step 542, a receive flag designated as the "Rx1" flag is set. The ARM timer is reset in step 544. The exemplary process of task 524 is completed in step 546 and the process returns to the START step 502 shown in FIG. 5A.

In step 526, a determination is made whether the received page represents a second data page in a sequence of pages received by the cellular communications device within a time period. For the exemplary process, the second data page in a sequence of a pair of pages is designated by the placement of a 4 or 5 in the minimum LSD of the MIN structure of the page message. If the response to this inquiry in step 526 is positive, the "YES" branch is followed to step 528 to initiate processing of the second data page. Otherwise, the "NO" branch is followed from step 526 to step 530.

Figure 5C:
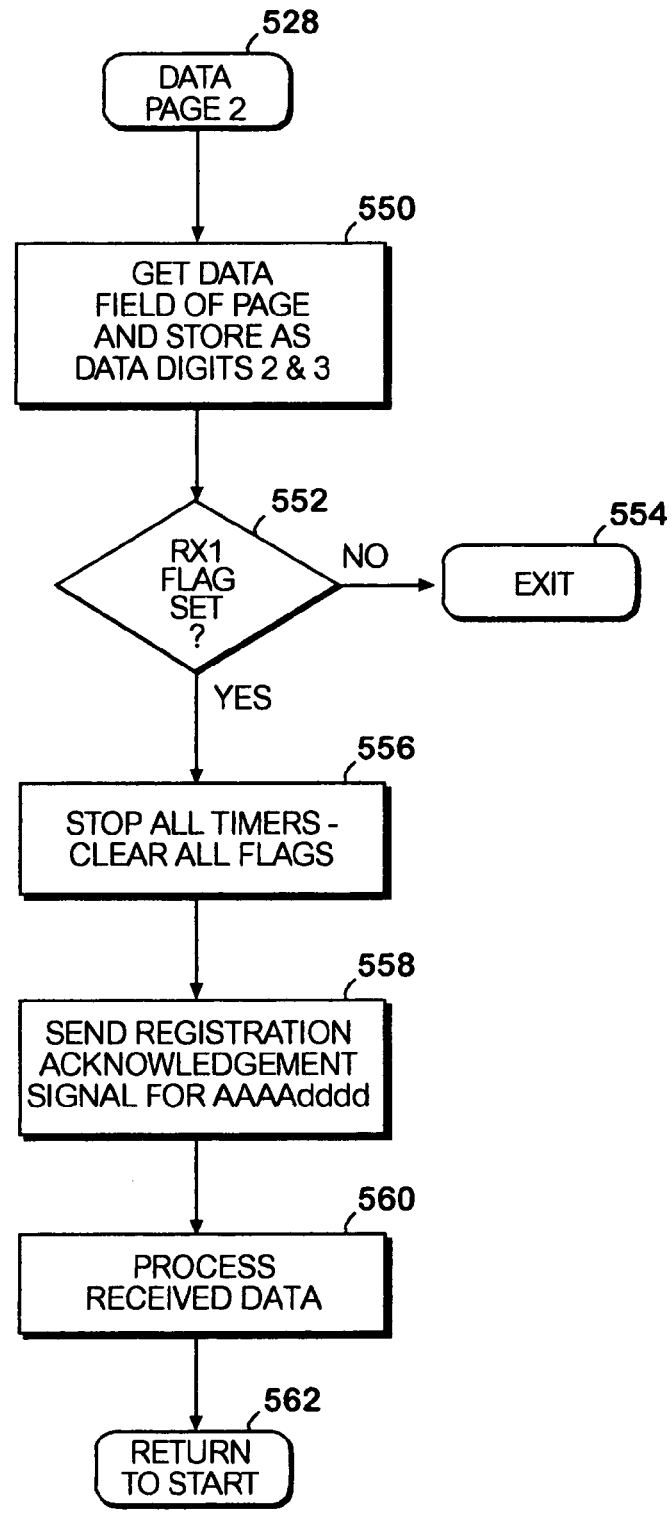

FIG. 5C is a logical flow chart diagram illustrating the sequence of steps completed by an exemplary process for processing a second data page, alternatively described in FIG. 5C as "Data Page 2." Turning now briefly to FIG. 5C, the exemplary process at task 528 is initiated by extracting the data field of the second data page and storing the extracted as data digits 2 and 3 in local storage at the cellular communications device. Data digits 2 and 3 are preferably stored in big-endian order. In step 552, an inquiry is conducted to determine whether the Rx1 flag is set. The Rx1 flag is set only if the cellular communications device has already received the first data page in a sequence of a pair of data pages. If the response to this inquiry is negative, the "NO" branch is followed from step 552 to the EXIT step 534. If the Rx1 flag is set in step 552, the. "YES" branch is followed to step 556 and all timers and flags are cleared at the cellular communications device. The timers and flags are cleared because the data sequence has been collected from the expected pair of data pages, thereby completing the data collection task for this page sequence.

In step 558, the cellular communications device can send an acknowledgement signal to confirm receipt of the data carried by the received data pages. The acknowledgement signal is preferably formatted as an Autonomous Registration signal in the form of AAAAdddd. An Acknowledge Pattern is represented by "AAAA (hex)", whereas received data is represented by the "dddd" pattern. The cellular communications device sends the acknowledgement signal via the RECC to the MSC of the CMR system.

In step 560, the received data is processed by the cellular communications device. This data processing task can include forwarding the data from the received pages to a controller, such as a PLC, to program control operations for completion by that device. The cellular communications device typically forwards the received data via a wired or wireless communications link to the controller. In turn, the controller can store the programming data within a look-up table maintained in its memory. For example, the received data can designate a slot or entry in the look-up table and programming data for storage within that look-up table slot. In step 562, the process returns to the START step 502 in FIG. 5A.

Returning now to FIG. 5A, an inquiry is conducted in decision step 530 to determine whether the received page represents a data page in a single message sequence. The placement of a 6 or 7 in the LSD of the MIN field of the received page designates a data page in a single message sequence. If the response to this inquiry is positive, the "YES" branch is followed from step 530 to step 532. Otherwise, the process 500 terminates at the EXIT step 534.

Figures 5D, 5E:
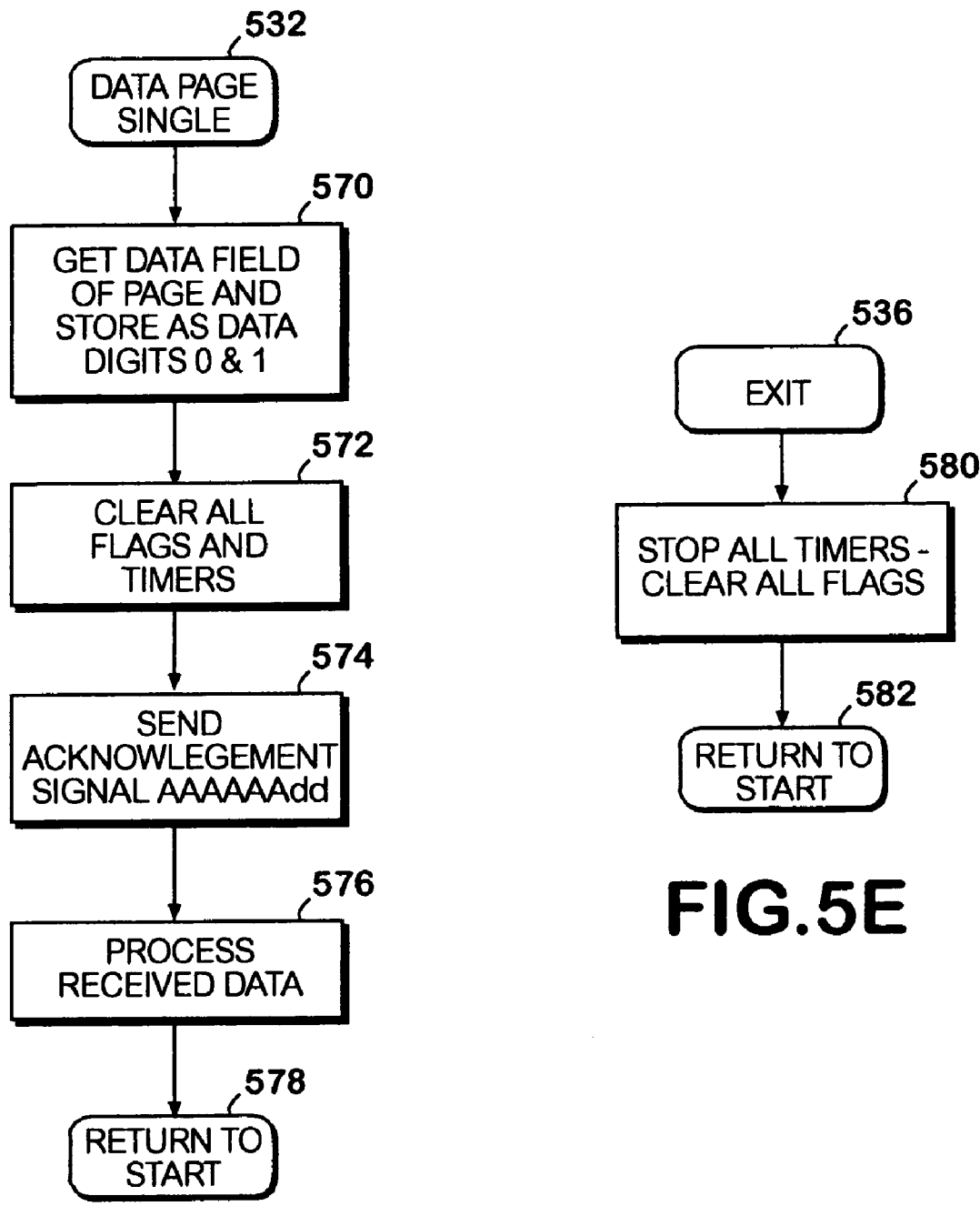

FIG. 5D is a logical flowchart diagram illustrating the sequence of steps completed by a exemplary process for processing a data page representing a single message sequence, alternative described as "Data Page Single." Referring to FIG. 5D, the receipt of a single data page message at step 532 initiates a data collection process at the cellular communications device. In step 570, the data field of the data page is extracted and stored as data digits. The data digits extracted from the data page are typically stored as digits 0 and 1 in big-endian order at the cellular communications device. In step 572, all timers and flags are cleared at the cellular communications device because the extraction of data from the single page message completes the data collection task. In step 574, the cellular communications device sends an acknowledgement signal to confirm receipt of the single data message. The cellular communications device typically sends the acknowledgement signal as an Autonomous Registration signal having a pattern AAAAAAdd. The "AAAAAA (hex)" pattern represents an Acknowledge Pattern, whereas the "dd" represents the received data of the single data message in BCD format in big-endian order. The cellular communications device transmits the acknowledgement signal via the RECC to the MSC of the CMR system. In turn, the collected data is processed in step 576 at the cellular communications device. Representative processing operations include the tasks described above in connection with step 560 of FIG. 5C. In step 578, the process returns to the START step 502.

If the response to the inquiry conducted in decision step 530 is negative, the process proceeds to the EXIT step 534. As shown in FIG. 5E, the EXIT step 534 requires the clearing of all flags and the termination of time periods by all timers at the cellular communications device, as shown in step 580. In step 582, the process returns to the START step 502.

As shown in FIGS. 5A, 5B, 5C, 5D, and 5E, collectively described as FIG. 5, when a data sequence carried by one or more pages is to be sent, the MSC 24, operating as a gateway, will send via the FOCC a target page to prompt an action by one or more cellular communications device 34 having the assigned target MIN. Cellular communications devices 34 are also described herein as a target radio. The MSC 24 will transmit the target pages twice over the FOCC within a predetermined time period, such as a. 60 second period, where the second page is preferably received after the first page during a period greater than 30 seconds and less than 60 seconds.

Upon receipt of a target page to its Primary (slot 0) MIN or Group 1 MIN (slot 1), the target radio 34 will start a prime timer having the predetermined time period, such as a 60 second timer. If the prime timer expires prior to a subsequent target page carrying the same MIN, the target radio 34 will execute a default function. If a second target page arrives prior to the prime timer's expiration, however, the target radio 34 activates an ARM timer having a predetermined time period, such as 60 seconds, and awaits receipt of the first data message, i.e., a page carrying data content. If that message is received via the FOCC prior to timer expiration, it will reset the ARM timer and continue to reset until all data is received. If at any time the ARM timer expires, then the target radio 34 will return to normal operation. All non-armed radios will ignore the data pages. The MSC will only simultaneously transmit one data sequence per MSCID to avoid target radio confusion.

The two data pages, called FOCC data messages, convey decimal digits of data via the FOCC to the now-armed target radio. If both FOCC data messages are correctly received, the target radio 34 preferably sends to the MSC 24 an Autonomous Registration signal with the upper 12 bits containing the Acknowledge Pattern "AAA (hex)". The lower 20 bits are the received data represented in BCD in big-endian order.

If a single FOCC data message is used (LSD of 6, 7), and this data page is correctly received, the target radio 34 will send an Autonomous Registration signal with the upper 24 bits containing the Acknowledge Pattern "AAAAAA (hex)". The lower 8 bits are the received data represented in BCD in big-endian order.

Table 3 describes a representative example for the communication of a target MIN and data content via a sequence of pages to a cellular communications device via the MSC. For this example, the assigned block of MINS are "009-100-0000 to 009-100-099." The memory of cellular communication devices responsive to target MINS within this assigned block have a memory mask set to "009-100-0aaa," where 'a' indicates a "wildcard" of zero through nine. In other words, the cellular communication devices representing the family of target radios have a memory mask set to "0090100-0aaaa, wherein the least four significant digits of the mask can be any number from zero through nine. To communicate the 5-digit data set of "47109" to a target radio, the page sequence defined in Table 3 is communicated as data pages by the MSC via the FOCC.

First, a target page having a target MIN assigned to the desired set of cellular communications devices 34 or target radios are transmitted by the MSC 24 via the FOCC within a 60 second period. For example, the MSC can send the target page having the MIN of "009-100-0999 to prompt an action by these target radios. Each activated target radio will now monitor the FOCC for one or more pages containing data content, also described as an data pages. For the example described in Table 3, the data content of "47109" is transmitted by the MSC as a pair of data pages, using either a default "even" MIN structure or a default "odd" MIN structure. For the even MIN structure, the first data page comprises "009-100-0900" to communicate the data content "09" and the second data page comprises "009-100-0174". In turn, the target radio can acknowledge receipt of this data content by sending an Autonomous Registration signal with the upper 12 bits comprising the Acknowledge Pattern of "AAA" (hex) and the lower 20 bits representing the received data content of "47109".

TABLE 3

Representative Example of a Paging Sequence

| | |
|---|---|
| Block of MINs assigned: | 009-100-0000 to 009-100-0999 (1K total) |
| MIN Mask set to: | 009-100-0aaa where 'a' indicates a wildcard 0 through 9 |
| FOCC DATA to be conveyed: | 47109 |
| FOCC Data Page 1: | 009-100-0900 (for even Default MIN) |
| | 009-100-0901 (for odd Default MIN) |
| FOCC Data Page 2: | 009-100-0174 (for even Default MIN) |
| | 009-100-0175 (for odd Default MIN) |
| Registration Response: | AAA47109 (hex) |

Table 4 describes another representative example for the communication of a target MIN and data content via a sequence of pages to a cellular communications device via the MSC. In contrast to the example shown in Table 3, however, the data content is transmitted by the MSC 24 to each target radio 34 in the form of a single data page "009-100-0586" for an even default MIN or "001-100-0587" for an odd default MIN."

TABLE 4

Alternative Example of a Paging Sequence

| | |
|---|---|
| Block of MINs assigned: | 009-100-0000 to 009-100-0999 (1K total) |
| MIN Mask set to: | 009-100-0aaa where 'a' indicates a wildcard 0 through 9 |
| FOCC DATA to be conveyed: | 85 |
| FOCC Data Page 1: | 009-100-0586 (for even Default MIN) |
| | 009-100-0587 (for odd Default MIN) |
| Registration Response: | AAAAAA85 (hex) |

Commands and data can be transmitted by the MSC 24 via the cellular network control channel 38 to cellular communications devices 34 coupled to controllers 32', such a programmable logic controllers (PLCs). A controller 32', also described as a PLC, can be programmed by sending the programming content from the MSC 24 to the cellular communications device 34 coupled to that controller. In turn, the cellular communications device 34 can forward the received programming to the controller 32'. For controller applications, an inventive data protocol can be used to support the performance of control tasks relative to a pre-defined schedule of events. Examples of applications that are able to use such a protocol include, but are not limited to, irrigation systems, gate controls, entry systems, lighting controls, etc.

For a representative weekly schedule application, each PLC can be programmed in memory based on a 100-entry look-up table to minimize the amount of weekly paging required for a given unit. Each entry (slot) in the look-up table can be stored in a memory location of the PLC at the time of manufacture or prior to installation for the specific control application. In the alternative, the look-up table programming can be communicated to the PLC by sending a programming entry to the corresponding cellular communications device. A typical schedule for a control application is a one-week schedule. An example of a look-up table for a single use facility, based on 5 schedules (00–04) and 24-hour time (0000–2400 hours), is shown below in Table 5. The schedule shown in Table 5 can be preprogrammed into a PLC during the start-up phase of the controllable system.

TABLE 5

Schedule for a Representative Control Application

| | Sunday | | Monday | | Tuesday | | Wednesday | | Thursday | | Friday | | Saturday | |
|---|---|---|---|---|---|---|---|---|---|---|---|---|---|---|
| Schedule | On | Off | On | Off | On | Off | On | Off | On | Off | On | Off | On | Off |
| 00 | 1600 | 2100 | 1800 | 2200 | 1800 | 2200 | 1800 | 2200 | 1800 | 2200 | 1800 | 2200 | 1600 | 2100 |
| 01 | 1615 | 2115 | 1815 | 2215 | 1815 | 2215 | 1815 | 2215 | 1815 | 2215 | 1815 | 2215 | 1615 | 2115 |
| 02 | 1630 | 2130 | 1830 | 2230 | 1830 | 2230 | 1830 | 2230 | 1830 | 2230 | 1830 | 2230 | 1630 | 2130 |
| 03 | | | 1700 | 2300 | 1700 | 2300 | 1700 | 2300 | 1700 | 2300 | 1700 | 2300 | | |
| 04 | | | 1700 | 2100 | 1700 | 2100 | 1700 | 2100 | 1700 | 2100 | 1700 | 2100 | | |

An example of a representative page message structure for a schedule command is shown in Table 6.

TABLE 6

Schedule Command Message Structure

| Command MIN: | 080 100 CNNA |
|---|---| where,

C - is the designator for command MIN
NN - is the two digit slot number in the look-up table
A - is either an 8 or a 9 to denote a standard schedule command This exemplary schedule command page has the MIN format of 080-100-CNNA, where the MIN suffix CNNA is a 4-digit representation of the combination of the command MIN designator (C), the look-up table slot number (NN) and the schedule command (A). The "080-100" portion of the MIN has been set aside or reserved for use in connection with weekly schedule paging applications.

The paging of a unit for each week can comprise the representative paging sequence shown in Table 7.

TABLE 7

Schedule Command Paging Sequence

| First Page: | Default MIN (example: 080-100-5151) |
|---|---|
| Second Page: | Schedule MIN (example: 080-100-1039) | where,

1 - is the designator for the command MIN
03 is the schedule, or slot in the look-up table (memory location)
9 - is the odd designator for a standard schedule The first page serves as a target page having the default MIN or target MIN to alert the desired target radios to monitor the FOCC for schedule programming information in the form of another page, typically a schedule command page. If a target radio having the MIN mask corresponding to the default MIN "080-101-5151" receives a page having that MIN, then the target radio will start to monitor the FOCC for a page carrying the schedule MIN. The schedule command page carries the data content of "1039", which designates the page as a command page, defines the appropriate slot in the programming look-up table, and identifies the standard schedule.

Once the target radio has received both the target page and the schedule command page, the target radio issues an Autonomous Registration signal serving as an acknowledgment of the command receipt. This acknowledgement comprises the form "AAAAAANN" for at least 64 seconds after the target page has been received. The "AAAAAA" field represents an Acknowledgment Pattern, whereas the "NN" field represents the looking table slot number. If the registration acknowledgment is not received, then the page sequence can be reissued for a predetermined number of times, typically up to two more times by the MSC.

Figure 6:
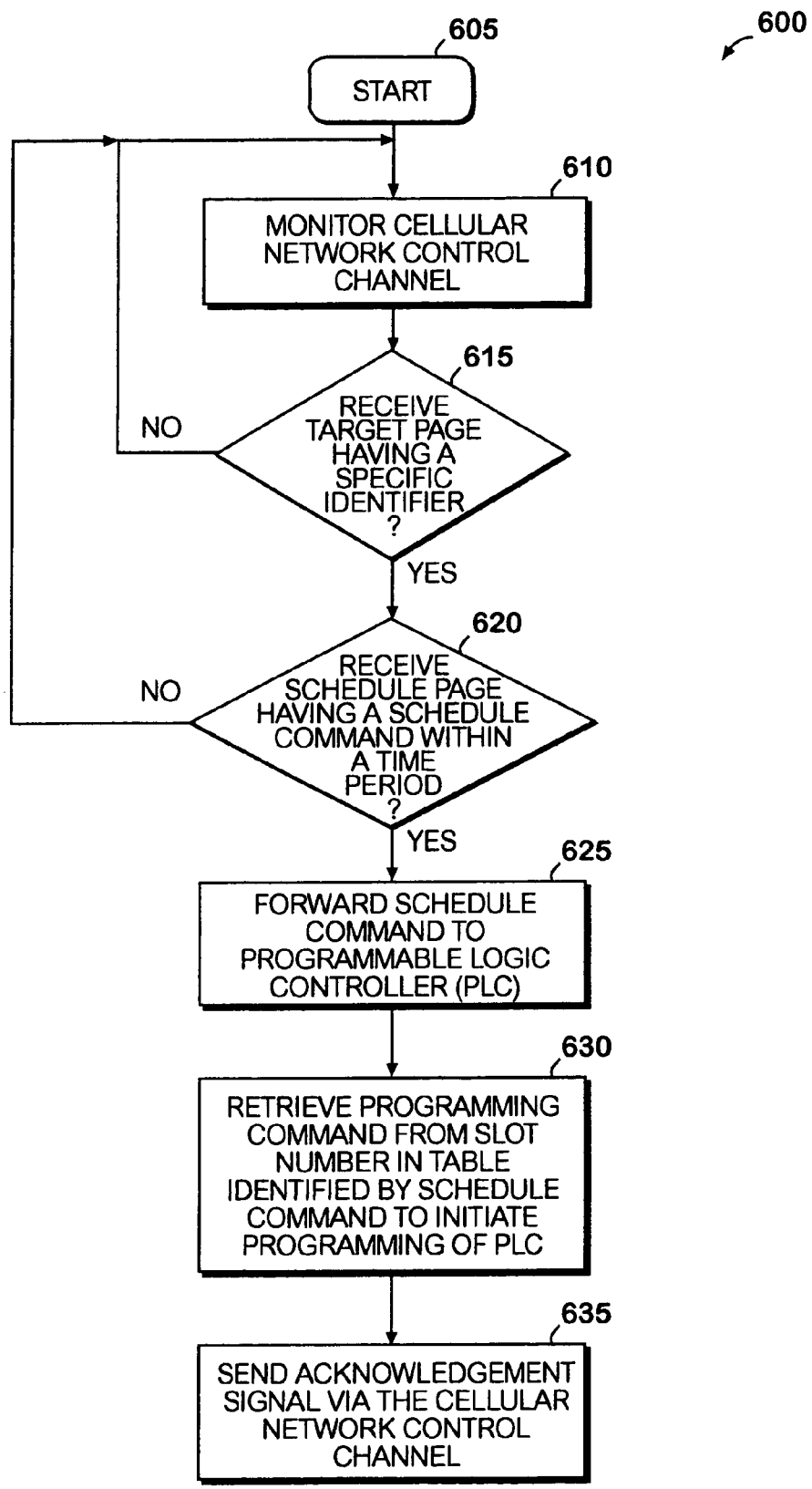
FIG. 6 is a logical flow chart diagram illustrating the steps for programming a remote programmable logic controller by sending a set of paging messages in accordance with an exemplary embodiment of the present invention.

FIG. 6 illustrates the steps of an exemplary process for programming a controller, such as a PLC, by sending a sequence of pages via a cellular network control channel to a cellular communications device. Turning now to FIG. 6, an exemplary programming process 600 is initiated at the START step 605 and proceeds to step 610. The cellular communications device monitors the cellular network control channel in step 610 for pages transmitted by the MSC via the FOCC. Representative pages carried by the FOCC can include target pages, data pages schedule command pages, ON/OFF override command pages and data request command pages. Representative examples of target messages and data messages have been described above in connection with FIG. 5 and Tables 3 and 4. Schedule command messages are described above in Tables 6–7 and below in Tables 8–10. ON/OFF override command pages are described below in Table 11, while data request command messages are described below in Table 12.

In decision step 615, an inquiry is conducted to determine whether the cellular communications device has received a target page having a specific identifier assigned to that device. If the response to this inquiry is negative, the "NO" branch is followed from step 615 to step 610. The receipt of a target page by the cellular communications device can transition the focus of monitoring operations from target pages to schedule command pages. In an alternative embodiment, the receipt of a pair of target pages within a predetermined time period will result in the transition of this monitoring operation from target pages to schedule command pages. In either embodiment, the reception of target page(s) having a matching identifier results in a transition of the focus of monitoring operations completed by the device.

In decision step 620, an inquiry is conducted to determine whether a schedule command page has been received within a predetermined time period by the cellular communications device. A negative response to this inquiry results in the process looping back to step 610 to continue monitoring operations. On the other hand, a positive response results in the process proceeding from decision step 620 via the "YES" branch to step 625.

In step 625, the cellular communications device extracts a schedule command from the schedule command page and forwards that command to a controller, such as a PLC coupled to the device. The data content of the scheduled command typically defines a slot for entry in a programming look-up table maintained in memory by the PLC. The look-up table includes multiple slots or entries, each stored in a memory location and containing programming data defining control operations for the PLC.

In step 630, the PLC retrieves a programming command from the look-up table slot identified by the schedule command page to initiate programming operations by the PLC.

In step 635, the cellular communications device can send an acknowledgement signal via the cellular network control channel. The acknowledgment signal is typically formatted as an Autonomous Registration signal having a ESN field with the form "AAAAAANN." The cellular communications device transmits the acknowledgment signal via the RECC to the MSC to confirm receipt of the schedule command page.

An exemplary process for reprogramming the slots in the schedule look-up table of a PLC can be based on a communication by an MSC of a paging sequence over the FOCC to a cellular communications device coupled to the PLC. For a weekly schedule application involving a PLC having 8 controllable relays, the total number of permutations for the combination of 256 relay state possibilities, 288, 5-minute time segments in a 24-hour day, and a 7 day/week schedule is 516096. Consequently, an exemplary format for the programming data stream is SSPPPPPP, where "SS" is the slot number and "PPPPPP" is the permutation number. The data sent to the target radio comprises a slot number and a permutation number. This results in a total of four command pages and a page for the Default MIN. After every two command pages, the target radio preferably acknowledges receipt of the schedule commands with a Autonomous Registration signal having an ESN of the format "AAAAdddd". For this ESN format, "AAAA" signifies that this message is a page acknowledgment (an Acknowledgment Pattern) and "ddd" represents the data elements of the received pages.

The digits in a schedule command page can be used in accordance with the information shown in Table 8.

TABLE 8

Function of Least Significant Digit in MIN for Schedule Command Pages

| LSD of MIN | Function |
| --- | --- |
| 0,1 | First page of Look-up Table Programming |
| 2,3 | Second page of Look-up Table Programming, Data Request Pages, On/Off Override Pages |
| 4,5 | Third page of Look-up Table Programming |
| 6,7 | Fourth page of Look-up Table Programming |
| 8,9 | Weekly Schedule Pages |

As shown in Table 9, to reprogram the slots in the schedule look-up table of a PLC, an exemplary communication process is completed based on a paging sequence communicated over the FOCC between the MSC and a cellular communications device coupled to the PLC.

TABLE 9

Page Sequence for a Typical PLC Reprogramming Operation

1. MSC transmits default or target page to target radio(s).
2. MSC transmits schedule command page containing the slot in the schedule look-up table to the target radio(s).
3. MSC transmits schedule command page containing the 2 most significant digits of the permutation to the target radio(s).
4. Each target radio transmits to the MSC an Autonomous Registration signal containing the slot number and the 2 most significant digits of the permutation to acknowledge receipt of the schedule command pages.

TABLE 9-continued

Page Sequence for a Typical PLC Reprogramming Operation

5. MSC transmits schedule command page containing the next 2 significant digits of the permutation to the target radio(s).
6. MSC transmits schedule command page containing the 2 least significant digits of the permutation to the target radio(s).
7. Each target radio transmits to the MSC an Autonomous Registration signal containing the next 2 significant digits and the 2 least significant digits of the permutation to acknowledge receipt of the schedule command pages.

An example of a paging sequence for reprogramming communications is shown in Table 10:

TABLE 10

PLC Programming Example

| Slot Number to program: | 89 |
| --- | --- |
| Permutation number: | 503862 |
| Page 1: | 080-100-5151 |
| Page 2: | 080-100-1891 |
| Page 3: | 080-100-1503 |
| Registration 1: | AAAA 8950 |
| Page 4: | 080-100-1385 |
| Page 5: | 080-100-1627 |
| Registration 2: | AAAA3962 |

For the representative example of a sequence of pages described in Tables 9 and 10, the first page represents the target page having a default MIN to alert particular target radios having the corresponding MIN mask that commands and/or data will be communicated via the FOCC for use by those target radios. The representative example of this default MIN page is "080-100-5151," which designates an odd default MIN. The schedule slot number of "89" is defined by the second page of "080-100-1891." The least significant digit of "1" designates this page as the first page of look-up table programming. The third page of this paging sequence, "080-100-1503" defines the 2 most significant digits of the permutation, "50," and includes the least significant digit of "3" to designate this page as the second page of look-up table programming. In response to this page sequence, the target radio issues an acknowledgement signal in the form of an Autonomous Registration signal "AAAA8950," which contains the slot number "89" and the 2 most significant digits of the permutation "50."

In response to the acknowledgement signal, the MSC issues the fourth page of this paging sequence, "080-100-1385," which defines the next 2 most significant digits of the permutation, "38," and includes the least significant digit of "5" to designate this page as the third page of look-up table programming. In turn, the MSC transmits the fifth and final page of the paging sequence, "080-100-1627, which defines the 2 least significant digits of the permutation, "62," and includes the least significant digit of "7" to designate this page as the fourth page of look-up table programming. In response to this page sequence, the target radio issues an acknowledgement signal in the form of Autonomous Registration signal "AAAA3962," which contains the next 2 significant permutation digits "39" and the 2 least significant permutation digits "62."

If a programming change occurs locally, typically by the end user or a field technician, in a schedule look-up table, then the target radio can issue a registration sequence to the MSC. In turn, the MSC can forward this information to the data collection system as an update for the schedule information maintained at an Operations Center responsible for schedules.

Figure 7:
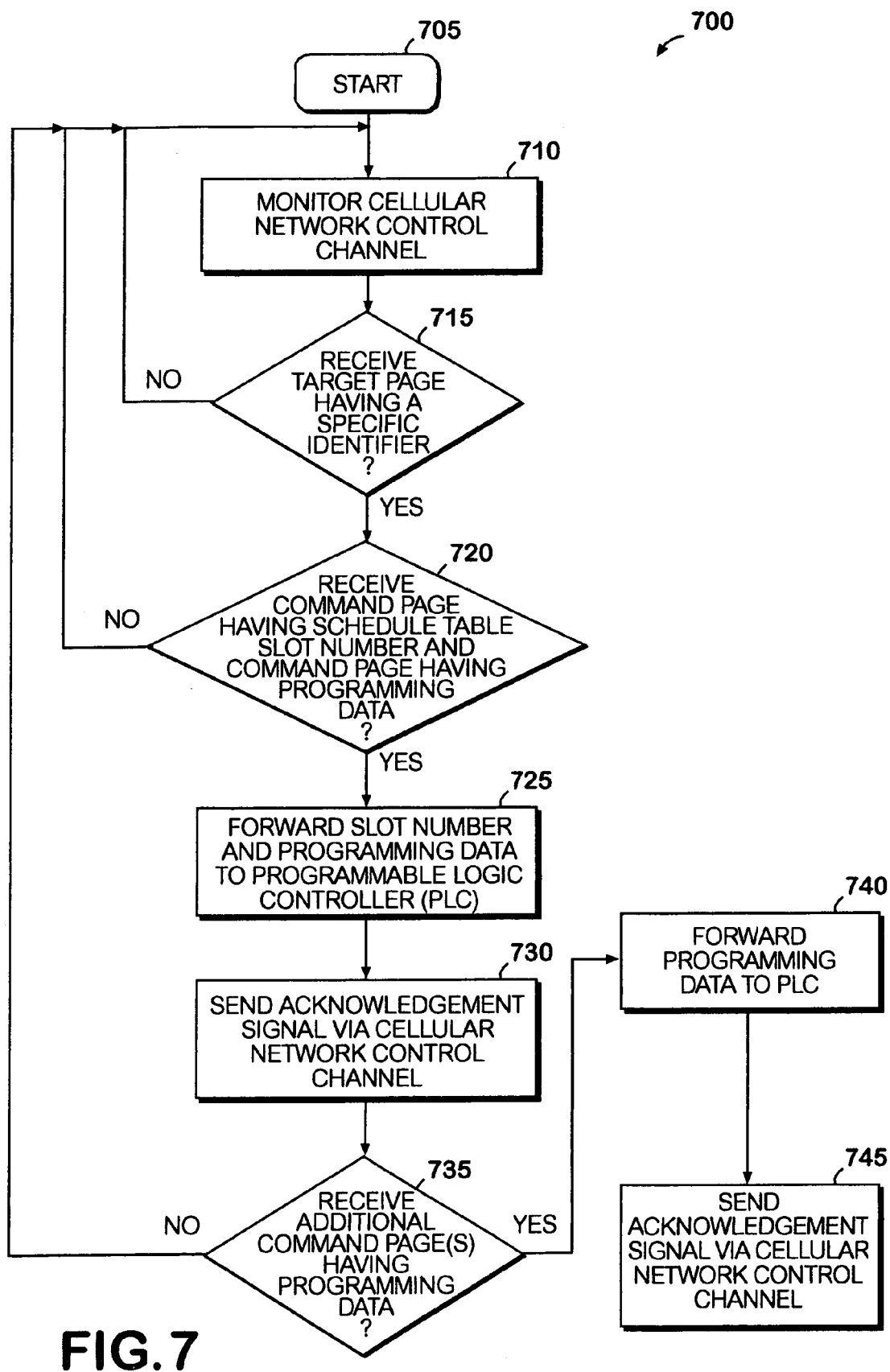
FIG. 7 is a logical flow chart diagram illustrating the steps for reprogramming a remote programmable logic controller by sending a set of paging messages in accordance with an exemplary embodiment of the present invention.

FIG. 7 is a logical flow chart diagram illustrating the steps for an exemplary process for reprogramming a controller, such as a PLC, by communicating a sequence of pages via a cellular network control channel to a cellular communications device operating within a CMR system. Turning now to FIG. 7, an exemplary reprogramming process 700 is initiated at the START step 705 and continues to step 710. In step 710, the cellular communications device monitors the cellular network control channel. In particular, the cellular communications device monitors the FOCC for pages issued by the MSC of the CMR system. In decision step 715, an inquiry is conducted to determine whether the cellular communications device has received a target page having a specific identifier assigned to that device. If the response to this inquiry is negative, the "NO" branch is followed from step 715 to step 710 to continue monitoring operations at the cellular communications device. If, on the other hand, the cellular communications device receives a target page having a matching identifier, the "YES" branch is followed from step 715 to step 720.

In decision step 720, a determination is made whether the cellular communications device has received a schedule command page having a schedule table slot number and a schedule command page having programming data. If the response to this inquiry is negative, the "NO" branch is followed from step 720 to step 710 to continue monitoring operations. If, on the other hand, the cellular communications device has received both schedule command pages within a predetermined time period, the "YES" branch is followed from step 720 to step 725.

In step 725, the cellular communications device extracts the schedule table slot number and the programming data from the pair of scheduled command pages and forwards this information to the PLC coupled to the device. In turn, the cellular communications device can send an acknowledgement signal via the cellular network control channel in step 730. The acknowledgement signal is typically formatted as an Autonomous Registration signal for communication via the RECC to the MSC of the CMR system.

In decision step 735, a determination is made whether the cellular communications device has received additional scheduled command pages containing data during a predetermined time period. If the response to this inquiry is negative, the "NO" branch is followed from step 735 to step 710 to continue monitoring operations at the cellular communications device. If, on the other hand, the cellular communications device has received additional schedule command pages in a timely fashion, the "YES" branch is followed to step 740. For an exemplary embodiment, programming data is typically carried by this pair of additional scheduled command pages. The programming data carried by the additional scheduled command pages is extracted by the cellular communications device and forwarded to the PLC in step 740. This programming data can be combined with the slot number and programming data received by the PLC in step 725 to support a reprogramming operation at the PLC. For example, the combination of programming data can be stored by a look-up table at the slot number identified by a received scheduled command page to update or to reprogram the programming data at that look-up table slot.

In step 745, the cellular communications device can send an acknowledgement signal via the cellular network control channel to acknowledge receipt of the additional schedule command pages. The cellular communications device typically transmits the acknowledgement signal as an Autonomous Registration signal via the RECC to the MSC of the CMR system.

For a representative PLC, there exists 8 preprogrammed Modes, or Relay States. An exemplary example of the page structure for an On/Off override command MIN is shown in Table 11.

TABLE 11

Page Structure for an On/Off Override Command MIN

| On/Off Command: | 080 100 1FMB |
|---|---|
| where, | |

F - is either a 9 (for On) or an 8 (for Off)
M - is the preprogrammed mode in the PLC
B - is either a 2 or a 3 (even or odd) depending on the default MIN The paging sequence for the On/Off Override Command typically comprises a target page having the default MIN followed by the command page. Once a target radio has received both pages, it issues an Autonomous Registration signal of the format AAAAAAAA at least 64 seconds after reception of the default MIN. If this acknowledgment signal is not received by the MSC via the FOCC within a certain time period, then the MSC reissues the page sequence.

Figure 8:
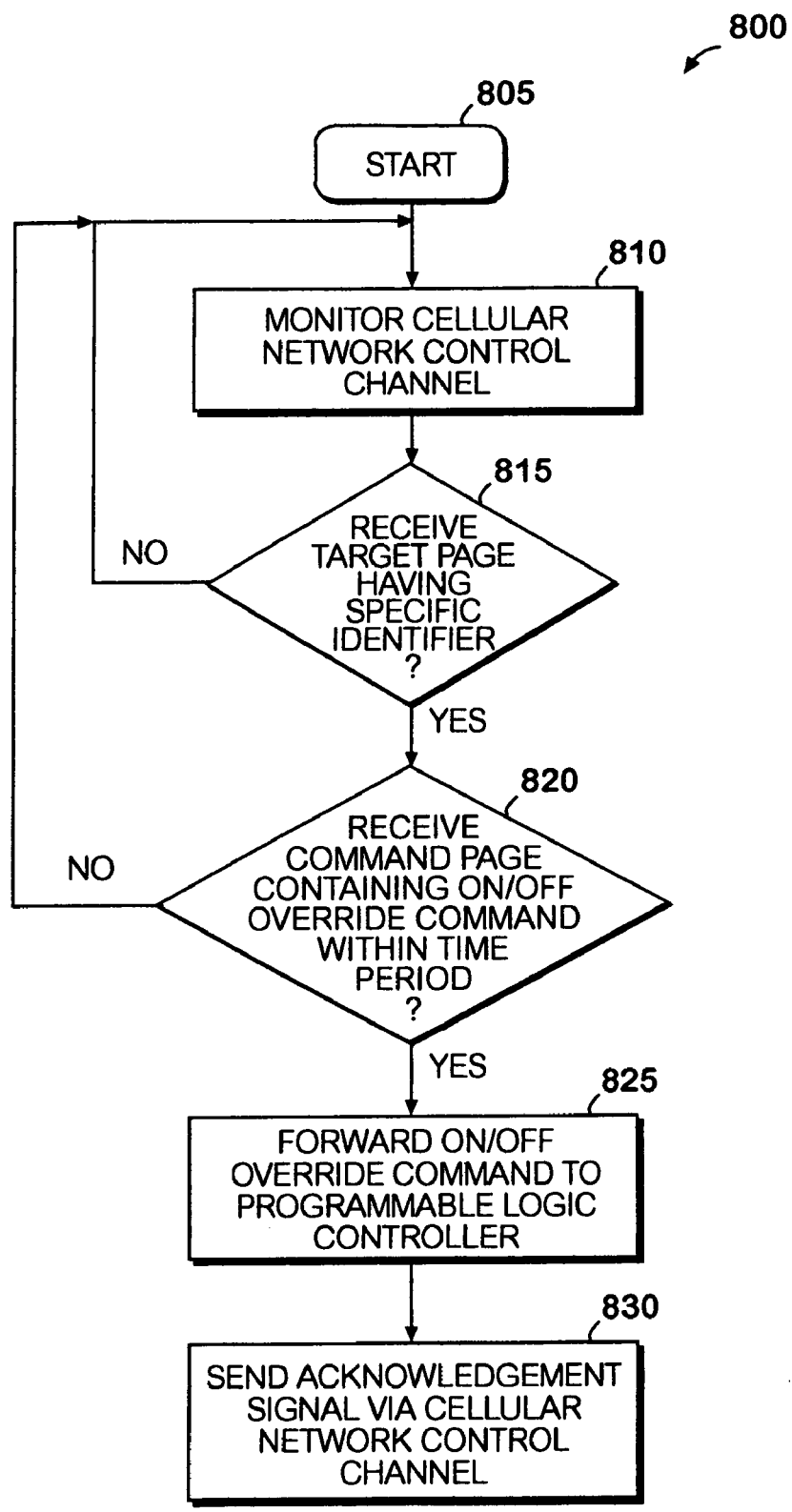
FIG. 8 is a logical flow chart diagram illustrating the steps for communicating an ON/OFF override command to a programmable logic controller by sending a set of paging messages in accordance with an exemplary embodiment of the present invention.

FIG. 8 illustrates an exemplary process for communicating pages via a cellular network control channel of a CMR system to communicate an ON/OFF override command to a controller coupled to a cellular communications device. Turning now to FIG. 8, an exemplary process 800 is initiated at the START step 805 and proceeds to the step 810. In step 810, the cellular communications device monitors the cellular network control channel for one or more pages issued by the MSC via the FOCC. In decision step 815, an inquiry is conducted to determine whether the cellular communications device has received a target page having a specific identifier assigned to the device. If the response to this inquiry is negative, the "NO" branch is followed to step 810 from step 815 to continue monitoring operations by the cellular communications device. If the cellular communications device has received a target page with a matching identifier, the "YES" branch is followed from step 815 to step 820.

In step 820, a determination is made whether the cellular communications device has received a command page carrying an ON/OFF override command via the cellular network control channel. If the cellular communications device has not received the command page, the "NO" branch is followed from step 820 to step 810 to continue monitoring operations. If, on the other hand, the cellular communications device has received a command page with an ON/OFF override command during a predetermined time period, the process follows the "YES" branch from step 820 to step 825. The cellular communications device forwards the ON/OFF override command in step 825 to the PLC coupled to the device. The PLC can store the ON/OFF override command within memory, such as the programming look-up table.

In step 830, the cellular communications device transmits an acknowledgement signal via the cellular network control channel to acknowledge receipt of the command page carrying the ON/OFF override command. The acknowledgment signal is preferably formatted as an Autonomous Registration signal carried by the RECC for receipt by the MSC of the CMR system.

In a representative example of a PLC device, there exists 10 preprogrammed responses to data requests. An example of the structure for data request command page is shown below in Table 12.

TABLE 12

Page Structure for a Data Request Command MIN

Data Request Command: 080 100 1FMB
where,

F - is a 6
M - is the preprogrammed data request format (0 through 9)
B - is either a 2 or a 3 (even or odd) depending on the default MIN The paging sequence for the Data Request Command consists of the target page carrying the default MIN followed by the data request page. Once the target radio has received both pages, it can issue an Autonomous Registration signal carrying the requested data in the form of a data message. If the registration signal is not received within a certain time period of the MSC, then the page sequence can be reissued by the MSC.

In normal operation, when the target radio issues an alarm, the alarm message comprises an Autonomous Registration signal transmittal via the RECC. This alarm message can be followed by an Autonomous Registration signal carrying specific information related to that alarm. Regular status registrations are preferably accomplished by a single registration formatted as an Autonomous Registration signal.

Figure 9:
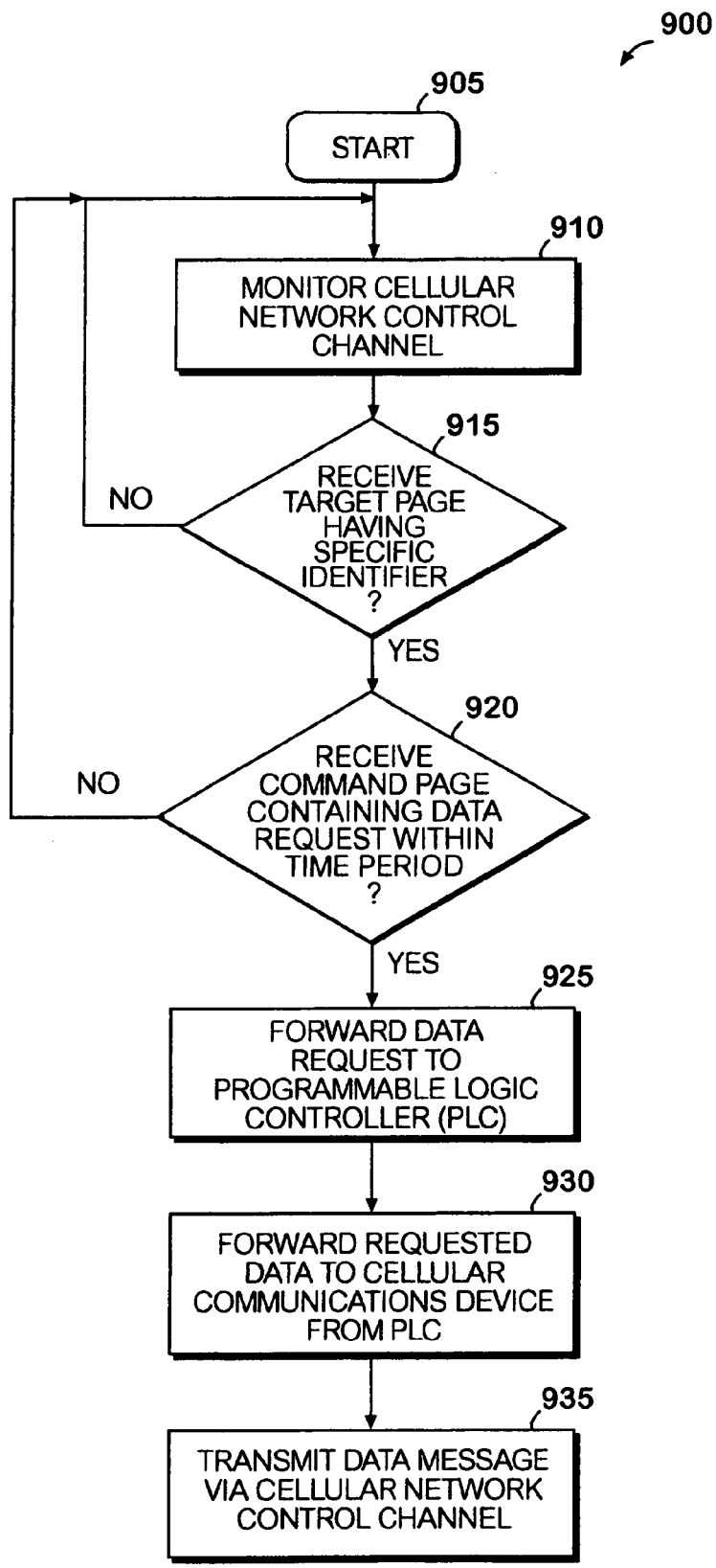
FIG. 9 is a logical flow chart diagram illustrating the steps for communicating a data request to a remote programmable logic controller by sending a set of paging messages in accordance with an exemplary embodiment of the present invention.

FIG. 9 illustrates an exemplary process for communicating pages via a cellular network control channel of CMR system to communicate a data request command to a controller coupled to a cellular communications device. Turning now to FIG. 9, an exemplary process 900 is initiated at the START step 905 and proceeds to the step 910. In step 910, the cellular communications device monitors the cellular network control channel for one or more pages issued by the MSC via the FOCC. In decision step 915, an inquiry is conducted to determine whether the cellular communications device has received a target page having a specific identifier assigned to the device. If the response to this inquiry is negative, the "NO" branch is followed to step 910 from step 915 to continue monitoring operations by the cellular communications device. If the cellular communications device has received a target page with a matching identifier, the "YES" branch is followed from step 915 to step 920.

In step 920, a determination is made whether the cellular communications device has received a data request page carrying a data request command via the cellular network control channel. If the cellular communications device has not received the data request page, the "NO" branch is followed from step 920 to step 910 to continue monitoring operations. If, on the other hand, the cellular communications device has received a data request page with a data request command during a predetermined time period, the process follows the "YES" branch from step 920 to 925. The cellular communications device forwards the data request command in step 925 to the PLC coupled to the device. The PLC can respond to the data request command by forwarding the requested data to the cellular communications device in step 930. In turn, the cellular communications device can issue in step 935 an Autonomous Registration signal formatted as a data message carrying the requested data. For the exemplary embodiment, the requested data is typically a preprogrammed response stored in memory of the PLC and associated with the particular data request.

A representative projection of the monthly traffic loading for a CMR system using the process controller scheduling protocol described above in Tables 5–12 is illustrated below in Table 13.

TABLE 13

Traffic Loading

|  | Frequency | Messages per month |
| --- | --- | --- |
| Paging due to Weekly Schedule Changes | once per week | 8 |
| Acknowledgments for Weekly Schedule Changes | once per week | 4 |
| Paging due to Look-up Table Programming | once per 3 months | 1.6 |
| Acknowledgments for Look-up Table Programming | once per 3 months | 0.6 |
| Pages for On/Off Override or Data Requests | 1 function per month | 2 |
| Acknowledgments for On/Off Override or Data Requests | 1 functions per month | 1 |
| Alarm/Status Registrations | 43 messages per month | 42 |
| Total Pages |  | 11.6 |
| Total Registration |  | 47.6 |
| Total Messages |  | 59.2 |
| Percent Paging |  | 19.6% |
| Percent Registrations |  | 80.4% |

It should be understood that the particular embodiments described herein have been disclosed by way of example and that other modifications may occur to those skilled in the art without departing from the spirit of the inventive concept.

What is claimed is:

1. A method for communicating a programming command to a programmable logic controller (PLC) by sending multiple pages via a cellular network control channel of a cellular mobile radio telephone system to a cellular communications device, comprising the steps of:

monitoring the cellular network control channel for a pair of target pages, each of the target pages having a specific identifier associated with the cellular communication device;

responsive to receiving the pair of target pages, monitoring the cellular network control channel for a schedule command page comprising a memory location, the memory location comprising a programming command for the PLC;

responsive to receiving the schedule command page, transmitting the memory location from the cellular communications device to the PLC to initiate the programming command stored at the memory location.

2. The method of claim 1, wherein the step of monitoring for the pair of target pages occurs during a first time period and the step of monitoring for the schedule command page occurs during a second time period.

3. The method of claim 1, further comprising the step of, responsive to receiving the pair of target pages, activating a timer.

4. The method of claim 1, wherein if the schedule command page specifies that a pair of command pages carry data, then monitoring the cellular network control channel for the second of the schedule command pages.

5. A communications device, operable for receiving multiple pages via a cellular network control channel and communicating a programming command to a PLC coupled to the communications device, the communications device operable to:

monitor the cellular network control channel for a pair of target pages, each of the target pages having a specific identifier associated with the communications device;

responsive to receiving the pair of target pages, monitor the cellular network control channel for a schedule command page comprising a memory location, the memory location comprising a programming command for the PLC;

responsive to receiving the schedule command page, transmit the memory location from the communications device to the PLC to initiate the programming command stored at the memory location.

6. The communications device of claim 5, further operable to monitor for the pair of target pages during a first time period and monitor for the schedule command page during a second time period.

7. The communications device of claim 5, further operable for activating a timer in response to receiving the pair of target pages.

8. The communications device of claim 5, further operable for monitoring the cellular network control channel for a second of the schedule command pages if the schedule command page specifies that a pair of command pages carry data.

* * * * *